United States Patent [19]
Furuta et al.

[11] Patent Number: 5,159,004
[45] Date of Patent: Oct. 27, 1992

[54] THERMOPLASTIC RESIN COMPOSITION

[75] Inventors: Motonobu Furuta, Tsukuba; Takashi Maruyama, Kobe; Hiroyuki Harada, Ichihara, all of Japan

[73] Assignee: Sumitomo Chemical Company, Limited, Osaka, Japan

[21] Appl. No.: 437,894

[22] Filed: Nov. 17, 1989

[30] Foreign Application Priority Data

Nov. 18, 1988 [JP] Japan .................. 63-292080
Dec. 15, 1988 [JP] Japan .................. 63-314863
Mar. 13, 1989 [JP] Japan .................. 1-060319

[51] Int. Cl.$^5$ .............. C08K 5/01; C08K 51/04; C08K 53/02; C08K 71/12
[52] U.S. Cl. ................... 524/390; 524/504; 524/506; 524/508; 525/63; 525/68; 525/70; 525/92; 525/93; 525/905
[58] Field of Search ............ 525/68, 92, 93, 905, 525/70; 524/508, 490, 504, 506

[56] References Cited

U.S. PATENT DOCUMENTS

| | | |
|---|---|---|
| 3,639,499 | 2/1972 | Snodgrass et al. . |
| 4,102,850 | 7/1978 | Cooper et al. . |
| 4,483,958 | 11/1984 | Kosaka et al. . |
| 4,863,997 | 9/1989 | Shibuya et al. ............ 525/905 |

FOREIGN PATENT DOCUMENTS

| | | |
|---|---|---|
| 01422166 | 5/1985 | European Pat. Off. . |
| 47-3136 | 2/1972 | Japan . |
| 51-73560 | 6/1976 | Japan . |
| 54-148836 | 11/1979 | Japan . |
| 59-126460 | 7/1984 | Japan . |

OTHER PUBLICATIONS

Kirk-Othmer Encyclopedia of Chemical Technology, Third Edition, vol. 17.

*Primary Examiner*—Jacob Ziegler
*Attorney, Agent, or Firm*—Birch, Stewart, Kolasch and Birch

[57] ABSTRACT

Disclosed herein is a thermoplastic resin composition which comprises:
(a) polyphenylene ether or a composition containing polyphenylene ether,
(b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer,
(c) a rubbery substance, and at least one component selected from the following three components;
(d) a styrene resin having a melt index of 8 or above (at 250° C. under a load of 5 kg),
(e) a low-molecular weight hydrocarbon resin, and
(f) white oil and/or liquid paraffin.

This thermoplastic resin composition exhibits not only good moldability but also well-balanced physical properties and heat resistance, and can be easily processed into molded articles having outstanding physical properties.

18 Claims, No Drawings

THERMOPLASTIC RESIN COMPOSITION

BACKGROUND OF THE INVENTION

1. Field of the Invention

The present invention relates to a novel thermoplastic resin composition which can be made into molded articles by injection molding, extrusion molding, or the like.

2. Related Art

Polyphenylene ether is a resin which is generally superior in heat resistance, hot water resistance, dimensional stability, and mechanical and electrical properties. On the other hand, it suffers from the disadvantage of having poor moldability (due to high melt viscosity), low chemical resistance, and low impact resistance.

It is known that polyphenylene ether will have improved moldability without any adverse effect on its superior characteristics when it is decreased in melt viscosity by the incorporation of a polystyrene resin. However, the resulting composition is still poor in chemical resistance.

It is disclosed in U.S. Pat. No. 4189411 and UK Patent No. 1344729 that a polyphenylene ether resin composition will have improved processability when it is decreased in molding temperature and melt viscosity by the incorporation of a low-molecular weight hydrocarbon resin.

Also, Japanese Patent Laid-open No. 118956/1980 discloses the incorporation of a petroleum-derived low-molecular weight resin or rosin resin into a polyphenylene ether resin composition for the reduction of its melt viscosity.

Japanese Patent Publication No. 13584/1982 discloses a method of decreasing the melt viscosity of polyphenylene ether by incorporation with an aromatic hydrocarbon resin derived from cracked naphtha.

Although the above-cited inventions are intended to improve the flowability of polyphenylene ether resin compositions, they achieve their object only with a great sacrifice in heat resistance. Also, they were not able to improve the chemical resistance of polyphenylene ether resin compositions.

Meanwhile, propylene polymers have been in general use for the production of molded articles, film, and sheet on account of their outstanding moldability, toughness, water resistance, and chemical resistance, and their low price attributable to their low specific gravity.

Unfortunately, propylene polymers have shortcomings or room for improvement in heat resistance, stiffness, impact resistance, coatability, and adhesion properties. This prevents the development of their new applications. There is an urgent need for improvement particularly in heat resistance and impact resistance.

For this reason, there is a demand for a resin composition composed of polyphenylene ether and a propylene polymer which would exhibit the features of both (i.e., improved moldability and improved impact resistance). It will find uses in new broad application areas.

In practice, however, no satisfactory resin compositions have been obtained from polyphenylene ether and polypropylene mixed together on account of their poor compatibility. It is only possible to obtain a resin composition which gives injection molded articles with phase separation between polyphenylene ether and polypropylene. This phase separation greatly deteriorates the appearance and mechanical properties of the molded articles.

The compatibility of polyphenylene ether with polypropylene may be improved by incorporating polyphenylene ether with a propylene polymer grafted with a styrene monomer, as disclosed in Japanese Patent Laid-open No. 75663/1974. This method, however, does not provide any composition which is superior in both heat resistance and impact resistance.

A resin composition having superior mechanical properties can be obtained by the incorporation of polyphenylene ether with a styrene monomer-grafted propylene polymer and a rubbery substance, as disclosed in Japanese Patent Application No. 33445/1988. However, it gives injection molded products which suffer segregation presumably on account of poor melt-flow characteristics.

Under these circumstances, there has been a strong demand for a composition composed of polyphenylene ether, modified propylene polymer, and rubber substance, said composition having good mechanical properties and giving injection molded articles with a good appearance.

In view of the forgoing, the present inventors carried out extensive studies to develop a new technology. As the result, they succeeded in the production of a new resin composition which is superior in heat resistance, melt-flow characteristics, processability, chemical resistance, appearance, and gloss. This success led to the present invention.

SUMMARY OF THE INVENTION

Accordingly, it is an object of the present invention to provide a thermoplastic resin composition which comprises:

(a) polyphenylene ether or a composition containing polyphenylene ether, (b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer, (c) a rubbery substance, and at least one component selected from the following three components;

(d) a styrene resin having a melt index of 8 or above (at 250° C. under a load of 5 kg), (e) a low-molecular weight hydrocarbon resin, and (f) white oil and/or liquid paraffin.

It is another object of the present invention to provide a thermoplastic resin composition which comprises:

(a) polyphenylene ether or a composition containing polyphenylene ether, (b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer, (c) a rubbery substance, and at least one component selected from the following three components;

styrene resin having a melt index of 8 or above (at 250° C. under a load of 5 kg), (e) a low-molecular weight hydrocarbon resin, and (f) white oil and/or liquid paraffin, the ratio of component (a) to component (b) being 1–90 wt% to 99–10 wt%, the amount of component (c) being 1-50 parts by weight for 100 parts by weight of the total amount of components (a) and (b), and the total amount of components (d), (e), and (f) being 0.1-50 parts by weight for 100 parts by weight of the total amount of components (a), (b), and (c).

It is further another object of the present invention to provide a thermoplastic resin composition which comprises:

(a) polyphenylene ether or a composition containing polyphenylene ether,
(b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer,
(c) a rubbery substance, and the following two components;
(e) a low-molecular weight hydrocarbon resin, and
(f) white oil and/or liquid paraffin.

It is further another object of the present invention to provide a thermoplastic resin composition which comprises:

(a) polyphenylene ether or a composition containing polyphenylene ether,
(b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer,
(c) a rubbery substance, and the following two components;
(e) a low-molecular weight hydrocarbon resin, and
(f) white oil and/or liquid paraffin. the ratio of component (a) to component (b) being 1-90 wt% to 99-10 wt%, the amount of component (c) being 1-50 parts by weight for 100 parts by weight of the total amount of components (a) and (b), and the total amount of components (e) and (f) being 0.1-50 parts by weight for 100 parts by weight of the total amount of components (a), (b), and (c).

It is further another object of the present invention to provide a thermoplastic resin composition which comprises:

(a) polyphenylene ether or a composition containing polyphenylene ether,
(b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer,
(c) a rubbery substance, and
(d) a styrene-based resin having a melt index of 8 or above (at 250° C. under a load of 5 kg).

the ratio of component (a) to component (b) being 1-90 wt% to 99-10 wt%, the amount of component (c) being 1-50 parts by weight for 100 parts by weight of the total amount of components (a) and (b), and the amount of component (d), being 1-30 parts by weight for 100 parts by weight of the total amount of components (a), (b), and (c).

It is still further another object of the present invention to provide a thermoplastic resin composition which comprises:

(a) polyphenylene ether or a composition containing polyphenylene ether,
(b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer,
(c) a rubbery substance, and
(e) a low-molecular weight hydrocarbon resin, the ratio of component (a) to component (b) being 1-90 wt% to 99-10 wt%, the amount of component (c) being 1-50 parts by weight for 100 parts by weight of the total amount of components (a) and (b), and the amount of component (e) being 0.1-50 parts by weight for 100 parts by weight of the total amount of components (a), (b), and (c).

It is another object of the present invention to provide a thermoplastic resin composition which comprises:

(a) polyphenylene ether or a composition containing polyphenylene ether,
(b) (i) a modified propylene polymer grafted with a styrene-based monomer or a mixture of a styrene-based monomer and a monomer copolymerizable with the styrene-based monomer, or (ii) a composition containing said modified propylene polymer and a propylene polymer,
(c) a rubbery substance, and
(f) white oil and/or liquid paraffin, the ratio of component (a) to component (b) being 1-90 wt% to 99-10 wt%, the amount of component (c) being 1-70 parts by weight for 100 parts by weight of the total amount of components (a) and (b), and the amount of component (f) being 0.1-30 parts by weight for 100 parts by weight of the total amount of components (a), (b), and (c).

DETAILED DESCRIPTION OF THE INVENTION

The polyphenylene ether used as component (a) in the present invention is obtained by the oxidation polymerization of one or more than one phenol compound represented by the general formula below with oxygen or an oxygen-containing gas by the aid of an oxidative coupling catalyst.

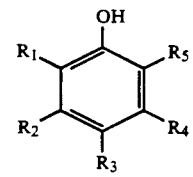

where $R_1$, $R_2$, $R_3$, $R_4$, and $R_5$ each independently denotes a hydrogen atom, a halogen atom, a hydrocarbon group or substituted hydrocarbon group, or a hydrocarbyloxy group or substituted hydrocarbyloxy group; and at least one of $R_1$ to $R_5$ is invariably a hydrogen atom.

Examples of $R_1$, $R_2$, $R_3$, $R_4$, and $R_5$ in the above formula include a hydrogen atom, chlorine atom, bromine atom, fluorine atom, iodine atom, methyl group, ethyl group, n-or iso-propyl group, pri-, sec-, or t-butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methyl phenyl group, dimethylphenyl group, ethylphenyl group, and allyl group.

Examples of the phenol compound represented by the general formula above include phenol, o-, m-, and p-cresol, 2,6-, 2,5-, 2,4-, and 3,5-dimethylphenol, 2-methyl-6-phenylphenol, 2,6-diphenylphenol, 2,6-diethylphenol, 2-methyl-6-ethylphenol, 2,3,5-, 2,3,6-, and 2,4,5-trimethylphenol, 3-methyl-6-t-butylphenol, thymol, and 2-metyl-6-allylphenol.

The polyphenylene ether may also be a copolymer of a phenol compound represented by the general formula above and a phenol compound other than that represented by the general formula above. Examples of the latter include polyhydroxy aromatic compounds such as bisphenol-A, tetrabromobisphenol-A, resorcinol, hydroquinone, and novolak resin.

The preferred polyphenylene ether is a homopolymer of 2,6-dimethylphenol (2,6-xylenol) or 2,6-diphenylphenol, or a copolymer composed of 2,6-xylenol (in a large amount) and 3-methyl-6-t-butylphenol or 2,3,6-trimethylphenol (in a small amount).

The oxidative coupling catalyst used for the oxidation polymerization of the phenol compound is not specifically limited so long as it is capable of polymerization. As the typical examples may be cited a catalyst composed of a cuprous salt and a tertiary amine (such as cuprous chloride-triethylamine and cuprous chloride-pyridine), a catalyst composed of a cupric salt, amine, and alkali metal hydroxide (such as cupric chloride-pyridine-potassium hydroxide), a catalyst composed of a manganese salt and a primary amine (such as manganese chloride-ethanolamine and manganese acetate-ethylenediamine), a catalyst composed of a manganese salt and an alcoholate or phenolate (such as manganese chloride-sodium methylate and manganese chloride-sodium phenolate), and a catalyst composed of a cobalt salt and a tertiary amine.

It is known that polyphenylene ether differs in physical properties depending on whether it is produced by oxidation polymerization at a temperature higher than 40° C. or lower than 40° C. Any polyphenylene ether produced by either high-temperature polymerization or low-temperature polymerization can be used in the present invention.

The polyphenylene ether used in the present invention also includes modified products obtained by grafting the above-mentioned polymer or copolymer with other polymer. Examples of such modified products are listed below. One which is obtained by the oxidation polymerization of a phenol represented by the general formula below

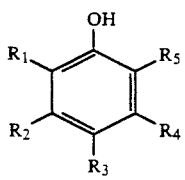

(wherein the symbols are defined as above.) which is performed in the presence of an ethylene-propylene-polyene terpolymer. One which is obtained by the oxidation polymerization of a phenol represented by the general formula below

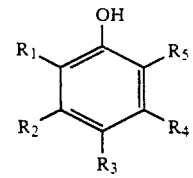

(wherein the symbols are defined as above.) which is performed in the presence of polystyrene. One which is obtained by grafting a polyphenylene ether polymer or copolymer with styrene and/or other polymerizable monomer by the aid of an organic peroxide. (See Japanese Patent Publication Nos. 47862/1972, 12197/1973, 5623/1974, 38596/1977, and 30991/1977.) One which is obtained by mixing the above-mentioned polyphenylene ether polymer or copolymer with a styrene polymer and a radical generator (e.g., peroxide) in an extruder. (See Japanese Patent Laid-open No. 142799/1977.)

According to the present invention, component (a) in the resin composition is polyphenylene ether or a composition containing polyphenylene ether. This composition is composed of the above-mentioned polyphenylene ether and an alkenyl aromatic resin and/or a rubber-modified alkenyl aromatic resin.

The alkenyl aromatic resin contains at least 25 wt% of a polymer unit derived from a monomer represented by the general formula [II] below.

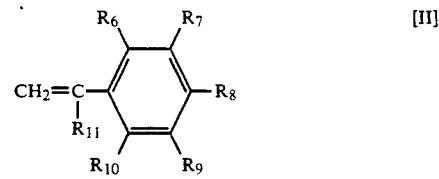

where $R_6$, $R_7$, $R_8$, $R_9$, and $R_{10}$ each independently represents a hydrogen atom, halogen atom, hydrocarbon group or substituted hydrocarbon group, and hydrocarbyloxy group or substituted hydrocarbyloxy group; and $R_{11}$ represents a hydrogen atom or a lower alkyl group having 1–4 carbon atoms.

Examples of $R_6$, $R_7$, $R_8$, $R_9$, and $R_{10}$ in the general formula [II] above include hydrogen atoms, halogen atoms (such as chlorine, bromine, and iodine), hydrocarbon groups (such as methyl, ethyl, propyl, vinyl, allyl, benzyl, and methylbenzyl), substituted hydrocarbon groups (such as chloromethyl and bromomethyl), and hydrocarbyloxy groups or substituted hydrocarbyloxy groups (such as methoxy, ethoxy, phenoxy, and monochloromethoxy). Examples of $R_{11}$ include hydrogen atoms and lower alkyl groups (such as methyl and ethyl).

Examples of the alkenyl aromatic resin include polystyrene, polychlorostyrene, poly-α-methylstyrene, copolymers thereof, and styrene-containing copolymers (such as styrene-acrylonitrile copolymer, styrene-divinylbenzene copolymer, and styrene-acrylonitrile-α-methylstyrene copolymer). Preferable among them are homopolystyrene, styrene-α-methylstyrene copolymer, styrene-α-chlorostyrene copolymer, styrene-methylmethacrylate copolymer. Homopolystyrene is most desirable.

The rubber-modified alkenyl aromatic resin is a resin of two-phase system which is composed of an alkenyl aromatic resin as the matrix and rubber particles dispersed in the matrix. This resin can be produced by the mechanical mixing of an alkenyl aromatic resin with a rubbery substance (which is component (c) explained later), or by the polymerization of an alkenyl aromatic monomer in which a rubbery substance has previously been dissolved. The latter process is used for the commercial production of so-called high-impact polystyrene. The one obtained by the latter process may be incorporated further with a rubbery substance and/or an alkenyl aromatic resin.

The polyphenylene ether and alkenyl aromatic resin and/or rubber-modified alkenyl aromatic resin may be mixed in a widely ranging ratio of 1-99 wt% to 99-1 wt%. An adequate ratio should be established according to the object and application.

The thermoplastic resin composition of the present invention also contains component (b) which is (i) a modified propylene polymer grafted with a styrene-based monomer or a mixture of a styrene-based monomer and a monomer copolymerizable with the styrene-based monomer, or (ii) a composition containing said modified propylene polymer and a propylene polymer.

The modified propylene polymer is one which is formed by grafting 100 parts by weight of propylene polymer with 0.2-150 parts by weight, preferably 2-90 parts by weight, of a styrene-based monomer or a mixture of a styrene-based monomer and a monomer copolymerizable with the styrene-based monomer. With an amount less than 0.2 part by weight, the modified propylene polymer has no improved properties. With an amount in excess of 150 parts by weight, the modified propylene polymer is poor in chemical resistance.

The propylene polymer denotes propylene homopolymers or propylene copolymers which include random or block copolymers consisting of propylene and an α-olefin having 2-18 carbon atoms.

Examples of the propylene copolymers include ethylene-propylene copolymer, propylene-1-butene copolymer, propylene-1-hexene copolymer, propylene-4-methyl-1-pentene copolymer, and propylene-1-octene copolymer.

The propylene polymer may be a highly crystalline propylene polymer, if necessary. This polymer is characterized by that the fraction of propylene homopolymer, which is the first segment formed in the first step of polymerization for a propylene homopolymer or copolymer, contains boiling heptane insolubles whose isotactic pentad ratio is higher than 0.970. This polymer is also characterized by that the fraction of propylene homopolymer contains boiling heptane insolubles whose isotactic pentad ratio is higher than 0.970, and contains less than 5.0 wt% of boiling heptane solubles and less than 2.0 wt% of xylene (20° C.) solubles.

The highly crystalline propylene polymer mentioned above can be produced by the processes disclosed in Japanese Patent Laid-open Nos. 28405/1985, 228504/1985, 218606/1986, and 287917/1986.

In the case where high stiffness is required, it is desirable to incorporate the propylene polymer with a nucleating agent. Examples of the nucleating agent include aluminum salt or sodium salt of aromatic carboxylic acid (Japanese Patent Laid-open No. 80829/1983), aromatic carboxylic acid, metal salt of aromatic phosphoric acid, and sorbitol derivatives (Japanese Patent Publication No. 12460/1980 and Japanese Patent Laid-open No. 129036/1983).

It is known that a similar function to that of a nucleating agent is performed by vinylcycloalkane polymers having 6 or more carbon atoms (Japanese Patent Laid-open No. 1738/1987). In other words, a propylene polymer composition containing 0.05 to 10000 ppm (by weight) of vinylcycloalkane units exhibits a higher crystallinity.

In addition, the above-mentioned highly crystalline propylene polymer will give a highly stiff propylene polymer when incorporated with a vinylcycloalkane polymer defined above.

According to the present invention, component (b) of the resin composition is prepared from one or more than one species of propylene polymer (propylene homopolymer and propylene copolymer) modified by grafting with a styrene-based monomer. This styrene-based monomer is represented by the general formula [II] below.

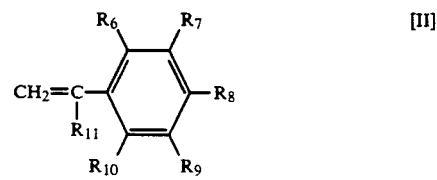

where $R_6$, $R_7$, $R_8$, $R_9$, and $R_{10}$ each independently represents a hydrogen atom, halogen atom, hydrocarbon group or substituted hydrocarbon group, and hydrocarbyloxy group or substituted hydrocarbyloxy group; and $R_{11}$ represents a hydrogen atom or a lower alkyl group having 1-4 carbon atoms.

Examples of $R_6$, $R_7$, $R_8$, $R_9$, and $R_{10}$ in the general formula [II] above include hydrogen atoms, halogen atoms (such as chlorine, bromine, and iodine), hydrocarbon groups (such as methyl, ethyl, propyl, vinyl, allyl, benzyl, and methylbenzyl), substituted hydrocarbon groups (such as chloromethyl and bromomethyl), and hydrocarbyloxy groups or substituted hydrocarbyloxy groups (such as methoxy, ethoxy, phenoxy, and monochloromethoxy). Examples of $R_{11}$ include hydrogen atoms and lower alkyl groups (such as methyl and ethyl).

Examples of the styrene-based monomer include styrene, 2,4-dichlorostyrene, p-methoxystyrene, p-methylstyrene, p-phenylstyrene, p-divinylbenzene, p-(chloromethoxy)-styrene, p-methylstyrene, o-methyl-α-methylstyrene, m-methyl-α-methylstyrene, p-methyl-α-methylstyrene, and p-methoxy-α-methylstyrene. They may be used alone or in combination with one another. Preferable among them is styrene.

The above-mentioned styrene-based monomer is not the only grafting monomer to prepare the modified propylene polymer in component (b). It is also possible to use a mixture of the styrene-based monomer and a monomer copolymerizable with it. Such a mixture provides the modified propylene polymer which is responsible for the thermoplastic resin having improved mechanical properties.

Examples of the monomer copolymerizable with the styrene-based monomer include acrylonitrile, methacrylonitrile, fumaric acid, maleic acid, vinyl ketone, maleic anhydride, acrylic acid, methacrylic acid, vinylidene chloride, maleate ester, methyl methacrylate, ethyl methacrylate, propyl methacrylate, butyl methacrylate, methyl acrylate, ethyl acrylate, propyl acrylate, butyl acrylate, vinyl chloride, vinyl acetate, divinyl benzene, ethylene oxide, glycidyl acrylate, glycidyl methacrylate, vinylidene chloride, isobutene, alkyl vinyl ether, anethole, indene, coumarone, benzofuran, 1,2-dihycronaphthalene, acenaphthylene, isoprene, chloroprene, trioxane, 1,3-dioxolane, propylene oxide, β-propiolactone, vinyl biphenyl, 1,1-diphenylethylene, 1-vinylnaphthalene, 2-vinylnaphthalene, 2-vinylpyridine, 4-vinylpyridine, 2,3-dimethylbutadiene, ethylene, propylene, allyltrimethylsilane, 3-butenyltrimethylsilane, vinyl carbazole, N,N-diphenylacrylamide, and fumarnitrile. Derivatives of these monomers can also be used. They may be used alone or in combination with one another. Preferable among them are maleic anhydride, glycidyl methacrylate, and glycidyl acrylate.

The amount of the styrene-based monomer in the mixture of the styrene-based monomer and the monomer copolymerizable with the styrene-based monomer may vary in the range of 1 to 100 wt%, depending on the intended used of the resin composition.

The styrene-based monomer and the monomer copolymerizable with the styrene-based monomer may be grafted to a propylene polymer by any known method. In other words, grafting can be accomplished by mixing a propylene polymer with a grafting monomer and a peroxide and melt-mixing the mixture in a melt-mixing apparatus; by dispersing a propylene polymer together with a grafting monomer into water, adding a peroxide to the dispersion, stirring the dispersion with heating under a nitrogen atmosphere, cooling the reaction system, and filtering out the reaction product, followed by washing and drying; or by exposing a propylene polymer to UV light, radiation, oxygen, or ozone in the presence of a grafting monomer.

Alternatively, grafting may also be accomplished in two stages. First, the styrene-based monomer and the monomer copolymerizable with the styrene-based monomer are polymerized or copolymerized individually by any known method. Secondly, the resulting polymer or copolymer is grafted to a propylene polymer.

For example, the grafting of a propylene polymer with a styrene-based monomer and an acrylate ester may be accomplished as follows: First, a copolymer is prepared from the styrene-based monomer and acrylate ester by anionic polymerization. Secondly, the copolymer is melt-mixed with a propylene polymer and a peroxide to give a modified propylene polymer. Alternatively, a propylene polymer may be copolymerized with a styrene-based monomer and glycidyl methacrylate by radical polymerization.

The peroxide used to prepare the modified propylene polymer is not specifically limited; it may be selected from the following organic peroxides.
2,2'-azobisisobutyronitrile,
2,2'-azobis(2,4,4-trimethylvaleronitrile), methyl ethyl ketone peroxide,
cyclohexanone peroxide,
3,3,5-trimethylcyclohexanone peroxide,
2,2-bis(t-butylperoxy)butane,
t-butyl hydroperoxide,
cumene hydroperoxide,
diisopropylbenzene hydroperoxide,
2,5-dimethylhexane-2,5-dihydroperoxide,
di-t-butyl peroxide,
1,3-bis(t-butylperoxyisopropyl)benzene,
2,5-dimethyl-2,5-di(t-butylperoxy)hexane,
2,5-dimethyl-2,5-di(t-butylperoxy)hexyne-3,
lauroyl peroxide,
3,3,5-trimethylhexanoyl peroxide,
benzoyl peroxide,
t-butyl peracetate,
t-butylperoxy isobutyrate,
t-butyloxy pivalate,
t-butyloxy-2-ethylhexanoate,
t-butylperoxy-3,5,5-trimethylhexanoate,
t-butyl peroxylaurate,
t-butyl peroxybenzoate,
di-t-butyl peroxyisophthalate,
2,5-dimethyl-2,5-di(benzoylperoxy)hexane,
t-butyl peroxymaleic acid,
t-butyl peroxyisopropyl carbonate, and
polystyrene peroxide.

Component (b) in the resin composition of the present invention is a propylene polymer modified with the above-mentioned styrene-based monomer or a mixture of the styrene-based monomer and a monomer copolymerizable with the styrene-based monomer. If necessary, this modified propylene polymer may be used in combination with an ethylene-α-olefin copolymer modified with a styrene-based monomer and/or an unmodified propylene polymer or ethylene-α-olefin copolymer.

Examples of the unmodified propylene polymer include propylene homopolymer and propylene copolymers such as ethylene-propylene copolymer, propylene-1-hexene copolymer, propylene-4-methyl-1-pentene copolymer, and propylene-1-octene copolymer, which have been given earlier to explain the modification with a styrene-based monomer.

As the α-olefin monomer constituting the ethylene-α-olefin copolymer may be cited α-olefins (excluding propylene) corresponding to the above-mentioned propylene copolymer.

The modified propylene polymer or ethylene-α-olefin copolymer to be used for component (b) should preferably be one which is derived from an unmodified polymer having a density of 0.82–0.92 g/cm$^3$.

The preferred amount is 1–40 parts by weight for 100 parts by weight of the modified propylene polymer and/or propylene polymer in component (b).

The incorporation of these components improves the impact resistance of the resin composition.

Component (b) in the thermoplastic resin composition of the present invention may be incorporated with a variety of additives, according to need, during the compounding process or during the fabricating process. Examples of the additives include antioxidant, heat stabilizer, light stabilizer, antistatic agent, inorganic and organic colorant, corrosion inhibitor, crosslinking agent, blowing agent, slip agent, plasticizer, fluorescent agent, surface smoothing agent, and surface brightener.

The thermoplastic resin composition of the present invention contains component (c), which is a rubbery substance, in addition to the above-mentioned components (a) and (b).

The "rubbery substance" denotes any natural and synthetic polymeric material which is elastic at room temperature. It includes, for example, natural rubber, butadiene polymer, butadiene-styrene copolymer (including random copolymer, block copolymer, and graft copolymer) and hydrogenated products thereof, isoprene polymer, chlorobutadiene polymer, butadiene-acrylonitrile copolymer, isobutylene polymer, isobutylene-butadiene copolymer, isobutylene-isoprene copolymer, acrylic ester copolymer, ethylene-propylene copolymer, ethylene-butene copolymer, ethylene-propylene-styrene copolymer, styrene-isoprene copolymer and hydrogenated products thereof, styrene-butylene copolymer, styrene-ethylene-propylene copolymer, perfluororubber, fluororubber, chloroprene rubber, butyl rubber, silicone rubber, ethylene-propylene-nonconjugated diene copolymer, thiokol rubber, polysulfide rubber, polyurethane rubber, polyether rubber (such as polypropylene oxide), epichlorohydrin rubber, polyester elastomer, polyamide elastomer, and epoxy group-containing copolymer.

The epoxy group-containing polymer denotes a copolymer composed of an unsaturated epoxy compound and an ethylenically unsaturated compound.

The epoxy group-containing polymer is not specifically limited in its composition; but it should preferably contain an unsaturated epoxy compound in an amount of 0 1-50 wt%, more desirably 1-30 wt%.

The unsaturated epoxy compound is a compound which has in the molecule an epoxy group and an unsaturated group copolymerizable with an ethylenically unsaturated compound.

Examples of the unsaturated epoxy compound are unsaturated glycidyl esters and unsaturated glycidyl ethers represented by the general formulas [III] and [IV] below, respectively.

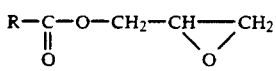

(where R is a $C_{2-18}$ hydrocarbon group having an ethylenically unsaturated bond.)

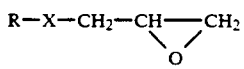

(where R is a $C_{2-18}$ hydrocarbon group having an ethylenically unsaturated bond, and X is a group represented by $-CH_2-O-$ or

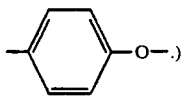

Examples of the compound represented by the formulas above include glycidyl acrylate, glycidyl methacrylate, glycidyl itaconate ester, allylglycidyl ether, 2-methylallylglycidyl ether, and styrene-p-glycidyl ether.

Examples of the ethylenically unsaturated compound include olefins, vinyl esters of saturated carboxylic acids having 2-6 carbon atoms, esters of acrylic acid or methacrylic acid with saturated alcohols having 1-8 carbon atoms, maleic ester, methacrylic ester, fumaric esters, halogenated vinyls, styrenes, nitriles, vinylethers, and acrylamides.

Specific examples include ethylene, propylene, butene-1, vinyl acetate, methyl acrylate, ethyl acrylate, methyl methacrylate, ethyl acrylate, methyl methacrylate, dimethyl maleate, diethyl fumarate, vinyl chloride, vinylidene chloride, styrene, acrylonitrile, isobutyl vinyl ether, and acrylamide. Preferable among them is ethylene.

When the epoxy group-containing copolymer as the rubbery substance is copolymerized with ethylene and vinyl acetate and/or methyl acrylate, it has a lower glass transition point. This improves further the impact resistance of the thermoplastic resin composition at low temperatures.

The rubbery substance may be produced by any process (e.g., emulsion polymerization and solution polymerization) using any catalyst (e.g., peroxide, trialkyl aluminum, lithium halide, and nickel-based catalyst).

Moreover, the rubbery substance may have a varied degree of crosslinking, a varied ratio of microstructure (e.g., cis-structure, trans-structure, and vinyl group), and a varied average rubber particle diameter.

In addition, the above-mentioned copolymer as the rubbery substance may be in the form of random copolymer, block copolymer, or graft copolymer. These copolymers may also be used in a modified form. Examples of the modifier include styrene, maleic anhydride, glycidyl methacrylate, glycidyl acrylate, and carboxylic acid-containing compounds. They may be used alone or in combination with one another.

The above-mentioned rubbery substances (including modified products thereof) may be used alone or in combination with one another.

Preferred examples of the rubbery substance include ethylene-α-olefin copolymer rubbers (such as ethylene-propylene copolymer, ethylene-propylene-nonconjugated diene copolymer and styrene-modified products thereof, and butadiene-styrene copolymer and hydrogenated products thereof).

Examples of the ethylene-α-olefin copolymer rubbers include copolymers of ethylene with another α-olefin (such as propylene, 1-butene, 1-pentene, 1-hexene, 4-methyl-1-pentene, and 1-octene) and terpolymers (such as ethylene-propylene-1-butene copolymer). Preferable among them are ethylene-propylene copolymer rubber.

The ethylene-α-olefin copolymer rubber should contain ethylene in an amount of 15-85 wt%, preferably 40-80 wt%. With an ethylene content in excess of 85 wt%, the copolymer rubber has such a high crystalline structure that it is difficult to process under the ordinary rubber molding conditions. With an ethylene content less than 15 wt%, the copolymer rubber has a high glass transition point (Tg), losing some of its rubber properties. A preferred glass transition point is $-10°$ C. or below.

An ethylene-α-olefin-nonconjugated diene copolymer rubber is also preferable. In this case, the content of the nonconjugated diene should be less than 20 wt%. Otherwise, the copolymer rubber will be poor in fluidity due to gelation that takes place at the time of kneading. Preferred examples of the nonconjugated diene include ethylidene norbornene, dicyclopentadiene, and 1,4-hexadiene.

The copolymer rubber should have a number-average molecular weight in the range of 10,000 to 100,000 so that it can be kneaded in an extruder. With an excessively small molecular weight, the copolymer rubber is hard to handle for the feeding to an extruder. With an excessively high molecular weight, the copolymer rubber has such a low fluidity that it is difficult to process. The copolymer rubber should preferably have a Mooney viscosity ($ML_{1+4}$, 121° C.) of 5 to 120.

The copolymer rubber is not specifically limited in molecular weight distribution. However, it should preferably have a molecular weight distribution expressed in terms of Q value (the weight-average molecular weight divided by the number-average molecular weight) in the range of 1 to 30, desirably 2 to 20.

The rubbery substance as component (c) may also be a modified product of ethylene-α-olefin copolymer rubber. It includes an unsaturated dicarboxylic acid-modified ethylene-α-olefin copolymer rubber which is prepared by grafting the above-mentioned ethylene-α-olefin copolymer rubber with an unsaturated dicarboxylic acid. Examples of the unsaturated dicarboxylic acid include maleic anhydride, maleic acid, fumaric anhydride, and citraconic anhydride.

The modified ethylene-α-olefin copolymer rubber can be produced by any known process. For example, the maleic anhydride-modified ethylene-α-olefin copolymer rubber may be prepared in the following manner. First, the ethylene-α-olefin copolymer rubber is reacted with maleic anhydride by the aid of a radical initiator in a hydrocarbon solvent at 60°-150° C. for several minutes to several hours, to give a solution containing the modified rubber. If necessary, the solution may be incorporated with an alcohol or amine to convert the maleic anhydride into a half ester or half amide, respectively. The resulting solution is poured into a large amount of methanol or acetone to recover the desired modified rubber.

Alternatively, the modified copolymer rubber may also be obtained by mixing the ethylene-α-olefin copolymer rubber together with maleic anhydride and a radical initiator in an extruder. This is accomplished by, for example, mixing 100 parts by weight of rubber, 0.5-15 parts by weight of maleic anhydride, and 0.005-1.0 part by weight of radical initiator at 150°-300° C. for several minutes to about one hour. If necessary, a phenol-based antioxidant such as 2,6-di-t-butyl-4-hydroxytoluene (BHT) may be added to prevent gelation which would otherwise occur during mixing.

According to the present invention, the above-mentioned maleic anhydride-modified ethylene-α-olefin copolymer rubber may be replaced by any one of other modified ethylene-α-olefin copolymer rubbers. The modifier is a monomeric compound selected from methyl acrylate, methyl methacrylate, allylglycidyl ether, glycidyl methacrylate, and glycidyl acrylate. These monomeric compounds may also be used in combination with one another.

Moreover, the ethylene-α-olefin copolymer rubber may be used in combination with one or more than one of other modified ethylene-α-olefin copolymer rubbers.

The modified ethylene-α-olefin copolymer rubber formed by grafting with a styrene-based monomer may be prepared by not only the above-mentioned process but also the following process. That is, an ethylene-α-olefin copolymer rubber in the form of small chips or pellets is dispersed into pure water together with a dispersing agent. Subsequently, the copolymer rubber is impregnated with a styrene-based monomer, and the reaction is performed by the aid of a radical initiator at 50°-150° C. for 1-5 hours. Thus there is obtained a modified ethylene-α-olefin copolymer rubber grafted with a styrene-based monomer.

According to the present invention, the thermoplastic resin composition contains component (d) which is a styrene resin having a specific melt index value which is obtained by polymerizing one or more than one kind of the styrene-based monomers represented by the general formula [II] above.

Examples of the styrene polymer include the following.

Poly(alkylstyrene) such as polystyrene, poly(p-methylstyrene), poly(m-methylstyrene), poly(o-methylstyrene), poly(2,4-dimethylstyrene), poly(2,5-dimethylstyrene), poly(3,4-dimethylstyrene), poly(3,5-dimethylstyrene), and poly(p-t-butylstyrene).

Poly(halostyrene) such as poly(p-chlorostyrene), poly(m-chlorostyrene), poly(o-chlorostyrene), poly(p-bromostyrene), poly(m-bromostyrene), poly(o-bromostyrene), poly(p-fluorostyrene), poly(m-fluorostyrene), poly(o-fluorostyrene), and poly(o-methyl-p-fluorostyrene). Poly(halogen-substituted alkylstyrene) such as poly(p-chloromethylstyrene), poly(m-chloromethylstyrene), and poly(o-chloromethylstyrene).

Poly(alkoxystyrene) such as poly(p-methoxystyrene), poly(m-methoxystyrene), poly(o-methoxystyrene), poly(p-ethoxystyrene), poly(m-ethoxystyrene), and poly(o-ethoxystyrene).

Poly(carboxy ester styrene) such as poly(p-carboxymethylstyrene), poly(m-carboxymethylstyrene), and poly(o-carboxymethylstyrene).

Poly(alkyl ether styrene) such as poly(p-vinylbenzyl propyl ether).

Poly(alkylsilylstyrene) such as poly(p-trimethylsilylstyrene).

Poly(ethyl vinylbenzenesulfonate).

Poly(vinylbenzylmethoxy phosphite).

Preferable among them is polystyrene.

According to the present invention, the styrene polymer in component (d) should have a melt index (MI) of 8 or above at 250° C. under a load of 5 kg.

With a styrene polymer having an MI lower than 8, the resin composition is poor in fluidity at the time of molding and hence yields a molded article having poor gloss.

The styrene resin in component (d) may be incorporated with a proper amount of rubbery substance, mineral oil, plasticizer, flame retardant, pigment, and antioxidant according to the intended use. The styrene resin containing these additives should have an MI of 8 or above.

According to the present invention, the thermoplastic resin composition contains component (e) which is a low-molecular weight hydrocarbon resin. Component (e) produces the following effect when it is incorporated into the resin composition composed of components (a), (b), and (c). That is, it eliminates segregation which occurs in an injection molded article made of the conventional polyphenylene ether composition, without any adverse effect on the mechanical properties of the composition.

No elucidation has been made yet on the reason why component (e) produces the above-mentioned effect. It is considered that component (e) is highly compatible with any of components (a), (b), and (c) and hence it is evenly dispersed into the composition, with the result that the composition has a greatly improved melt-fluidity and provides an injection molded article which is free of segregation.

The low-molecular weight hydrocarbon resin constituting component (e) includes petroleum resins, terpenephenolic resins, terpene resins, rosin resins, coumaroneindene resins, aromatic hydrocarbon resins, alicyclic saturated hydrocarbon resins, and their hydrogenated and acid-modified products. They may be used alone or in combination with one another.

The above-mentioned petroleum resins are obtained by polymerizing the unsaturated hydrocarbon fractions having a boiling point of 20°-280° C. which are by-products obtained in the production of ethylene, propylene, butadiene, etc. from LPG, naphtha, kerosine, gas oil, heavy oil, or crude oil by thermal cracking (such as steam cracking, vapor phase thermal cracking, and sand cracking) or catalytic cracking.

The above-mentioned aromatic hydrocarbon resins denote oligomers obtained by polymerizing a mixture of unsaturated aromatic hydrocarbons (such as mixed vinyltoluenes and mixed vinylxylenes) formed by petroleum cracking.

The above-mentioned coumarone-indene resins are derived from a mixture of unsaturated polycyclic aromatic hydrocarbons contained in the light oil fraction produced by the dry distillation of coal.

The above-mentioned terpene phenolic resins and terpene resins are derived from petroleum naphtha.

The above-mentioned rosin resins are polymers of rosin composed mainly of abietinic acid and dextropuric acid obtained by the steam distillation of terpentine secreted from pines.

The low-molecular weight hydrocarbon resin used as component (e) in the present invention varies in molecular weight depending on the kind of the resin; it should have a molecular weight in the range of 200–5000, preferably 300–3000, most desirably 350–2500.

With an excessively small molecular weight, the hydrocarbon resin impairs the inherent properties of polyphenylene ether. With an excessively high molecular weight, the hydrocarbon resin does not improve the melt-fluidity of the composition.

The resin composition of the present invention contains component (f) which is at least one member selected from white oil and liquid paraffin.

White oil denotes a highly purified petroleum fraction which is a mixture of paraffin hydrocarbons and naphthene hydrocarbons and is free of aromatic compounds, acids, sulfur-containing compounds, and other impurities.

Liquid paraffin is a product obtained by removing unsaturated compounds, aromatic compounds, and sulfur from fractions obtained by the atmospheric distillation and vacuum distillation of crude oil.

The preferred constituents of component (f) are white oil and liquid paraffin having a viscosity of 40–400 (SUS second) at 37.8° C. according to JIS K-2283.

With a viscosity outside this range, white oil and liquid paraffin do not improve the melt-fluidity of the resin composition or impair the mechanical properties of the resin composition.

The white oil and liquid paraffin suitable for component (f) in the present invention are commercially available in many kinds. They include, for example, "Kaydol", "Gloria", "Protol", "Elball", "Brandol", "Carnation", "Clearol", "Orzol", "Britol", "Ludol", and "Benol" from Witco Chemicals Co., Ltd.; "Molesco White", "Smoil", "Lambus", "Silcol", and "Molescobioless" from Matsumura Sekiyu Co., Ltd.; "Crystol" from Esso Standard Co., Ltd.; "Unico" from Union Sekiyu Co., Ltd.; and "Daphene" from Idemitsu Sekiyu Kagaku Co., Ltd. Component (f) is not limited to them.

The thermoplastic resin composition of the present invention contains components (a), (b), and (c) and at least one component selected from components (d), (e), and (f).

According to the present invention, the thermoplastic resin composition exhibits its desired properties when it contains components (a), (b), and (c) and components (d), (e), and/or (f) in a ratio within a specific range.

The ratio of component (a) to component (b) may be 1–90 wt% to 9–10 wt%, preferably 20–80 wt% to 80–20 wt%, varying over a broad range. With component (b) less than 10 wt%, the resin composition is poor in processability and chemical resistance; with component (b) more than 99 wt%, the resin composition is poor in heat resistance (e.g., heat distortion temperature).

Component (c) should be used in an amount of 1–70 parts by weight for 100 parts by weight of the total amount of components (a) and (b). However, in the case where the resin composition contains components (d) and (e), component (c) should preferably be used in an amount of 1–50 parts by weight for 100 parts by weight of the total amount of components (a) and (b).

If the amount of component (c) is less than specified above, the resin composition is poor in impact resistance; and if the amount of component (c) is more than specified above, the resin composition does not permit polyphenylene ether to fully exhibit its inherent outstanding properties.

Component (d) should be used in an amount of 1–30 parts by weight for 100 parts by weight of the total amount of components (a), (b), and (c).

If the amount of component (d) is less than specified above, the resin composition is poor in melt-fluidity; and if the amount of component (d) is more than specified above, the resin composition does not permit polyphenylene ether to fully exhibit its inherent outstanding properties and the resin composition may be poor in impact resistance.

Component (e) should be used in an amount of 0.1–50 parts by weight, preferably 1–30 parts by weight, for 100 parts by weight of the total amount of components (a), (b), and (c).

If the amount of component (e) is less or more than specified above, the resin composition is poor in melt-fluidity or heat resistance.

Component (f) should be used in an amount of 0.1–30 parts by weight for 100 parts by weight of the total amount of components (a), (b), and (c).

If the amount of component (f) is less than specified above, the resin composition is poor in melt-fluidity; and if the amount of component (f) is more than specified above, the resin composition does not permit polyphenylene ether to fully exhibit its inherent outstanding properties.

In the case where components (d), (e), and (f) are all used, their total amount should be 1–50 parts by weight for 100 parts by of the total amount of components (a), (b), and (c).

The thermoplastic resin composition of the present invention may be incorporated with other polymeric compounds. They include polyolefins (such as polymethylpentene) (excluding polypropylene and modified polypropylene); homopolymers and copolymers of vinyl compounds (such as polyvinyl chloride, polymethyl methacrylate, polyvinyl acetate, polyvinyl pyridine, polyvinyl carbazole, polyacrylamide, polyacrylonitrile, ethylene-vinyl acetate copolymer, and alkenyl aromatic resins); polycarbonate, polysulfone, polyethylene terephthalate, polybutylene terephthalate, polyarylene ester (such as U-polymer made by Unitika Co., Ltd.), polyphenylene sulfide; polyamides (such as nylon 6, nylon 6,6, and nylon 12), and condensation polymers (such as polyacetal). Additional examples of the polymeric compounds include thermosetting resins such as silicone resin, fluorocarbon resin, polyimide, polyamideimide, phenolic resin, alkyd resin, unsaturated polyester resin, epoxy resin, and diallyl phthalate resin.

The thermoplastic resin composition of the present invention may also be incorporated with a reinforcing agent (such as glass fiber and carbon fiber), inorganic or organic filler (such as carbon black, silica, and $TiO_2$), plasticizer, stabilizer, flame retardant, dye, and pigment.

The reinforcing agent is added to improve the mechanical properties (such as flexural strength, flexural modulus, tensile strength, and tensile modulus) and thermal properties (such as heat distortion temperature) of the resin composition. Examples of the reinforcing agent include alumina fiber, carbon fiber, glass fiber, high modulus polyamide fiber, high modulus polyester fiber, silicon carbide fiber, and titanate whisker.

The reinforcing agent should be used in an amount enough to produce the reinforcing effect. The preferred amount is in the range of 5 to 100 parts by weight for 100 parts by weight of the resin composition.

The particularly preferred reinforcing filler is glass fiber filaments made of lime-aluminum borosilicate glass containing only a small amount of sodium (known as "Σ" glass). In the case where electric properties are not so important, glass fiber filaments made of low-sodium glass, known as "C" glass may also be useful. The filaments can be produced by the conventional process such as air blowing, flame blowing, and mechanical drawing. The filaments desirable for plastics reinforcement can be produced by mechanical drawing. The filaments made by this process have a diameter in the range of 2 to 20 μm. The filament diameter is not so critical in the present invention. The filament length and form are not so critical either. The glass filaments may be used in the form of roving, thread, rope, or mat. Glass filaments in the form of strand cut to 0.3-3 cm, preferably 0.6 cm and below, are convenient to use in the preparation of the resin composition of the present invention.

The flame retardant useful for the resin composition of the present invention includes a group of compounds known to those skilled in the art. Particularly important among them are those which contain a specific element such as bromine, chlorine, antimony, phosphorus, and nitrogen, which imparts flame retardance. Examples of the flame retardant include halogenated organic compounds, atimony oxide, a mixture of antimony oxide and halogenated organic compound, a mixture of antimony oxide and phosphorus compound, phosphorus (as a simple substance), phosphorus compounds, and a mixture of halogen-containing compound and phosphorus compound or a compound having the phosphorus-nitrogen bond. They may be used in combination with one another.

The flame retardant should be used in an amount enough to impart flame retardance to the resin composition, although the amount is not so critical. When used in an excessive amount, the flame retardant will deteriorate the physical properties of the resin composition, resulting in, for example, the lowering of the softening point. Therefore, the flame retardant should be used in an amount of 0.5-50 parts by weight, preferably 1-25 parts weight, and more preferably 3-15 parts by weight, for 100 parts by weight of polyphenylene ether or the resin composition containing polyphenylene ether.

The halogen-containing compounds useful as flame retardants are represented by the general formula below.

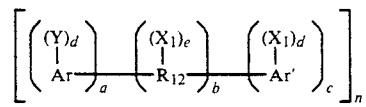

where n is 1 to 10; $R_{12}$ denotes a group selected from the group consisting of alkylene (such as methylene, ethylene, propylene, isopropylene, butylene, and isobutylene), alkylidene (such as isopropylidene and amylene), alicyclic linkage (such as cyclohexylene and cyclopentylidene), ether, carbonyl, amine, sulfur-containing linkage (such as sulfide, sulfoxide, and sulfone), carbonate, and phosphorus-containing linkage.

$R_{12}$ may also denote a group formed by the linkage of two or more alkylene or alkylidene groups through an aromatic, amino, ether, ester, carbonyl, sulfide, sulfoxide, sulfone, or phosphorus-containing group.

Ar and Ar' each denotes a monocyclic or polycyclic carbocyclic aromatic group such as phenylene, biphenylene, terphenylene, and naphthylene. Ar and Ar, may be the same or different.

Y denotes a substituent group selected from the group consisting of organic groups, inorganic groups, and organometallic groups. Examples of Y include (1) halogen (such as chlorine, bromine, iodine, and fluorine), (2) ether group represented by the general formula of —OE (where E denotes a monovalent hydrocarbon group as defined by $X_1$ below), (3) —OH group, (4) monovalent hydrocarbon group, and (5) other substituent groups (such as nitro group and cyano group). When d is 2 or above, the substituent groups represented by Y may be the same or different.

$X_1$ denotes a monovalent hydrocarbon group such as those listed below. Alkyl groups (such as methyl, ethyl, propyl, isopropyl, butyl, and decyl); aryl groups (such as phenyl, naphthyl, biphenyl, xylyl, and tolyl); aralkyl groups (such as benzyl and ethylphenyl); alicyclic groups (such as cyclopentyl and cyclohexyl); and monovalent hydrocarbon groups containing an inert substituent group. When there are two or more substituent groups represented by $X_1$, they may be the same or different.

The subscript d denotes an integer ranging from 1 to a number determined by the maximum number of substitutable hydrogen atoms on the aromatic ring represented by Ar or Ar'. The subscript e denotes 0 or an integer ranging from 1 to a number determined by the maximum number of substitutable hydrogen atoms on the group represented by $R_{12}$.

The subscripts a, b, and c each denotes an integer including 0. Unless b is 0, neither a nor c is 0; otherwise, either a or c may be 0. When b is 0, the aromatic groups are connected to each other directly through a carbon-carbon bond. The aromatic groups Ar and Ar' may have hydroxyl groups or substituent groups Y at any of the ortho, meta, and para positions.

Examples of the compound represented by the general formula above include the following.
2,2-bis-(3,5-dichlorophenyl)-propane,
bis-(2-chlorophenyl)-methane,
1,2-bis-(2,6-dichlorophenyl)-ethane,
1,1,-bis-(4-iodophenyl)-ethane,
1,1-bis-(2-chloro-4-iodophenyl)-ethane,
1,1-bis-(2-chloro-4-methylphehyl)-ethane,
1,1-bis-(3,5-dichlorophenyl)-ethane,
2,2-bis-(3-phenyl-4-bromophenyl)-ethane, 2,3-bis-(4.6-dichloronaphthyl)-propane,
2,2-bis-(2,6-dichlorophenyl)-pentane,
2,2-bis-(3,5-dichlorophenyl)-hexane,
bis-(4-chlorophenyl)-phenylmethane,
bis-(3,5-dichlorophenyl)-cyclohexylmethane,
bis-(3-nitro-4-bromophenyl)-methane,
bis-(4-oxy-2,6-dichloro-3-methoxyphenyl)-methane,
2,2-bis-(3,5-dibromo-4-oxyphenyl)-propane,
2,2-bis-(3,5-dichloro-4-oxyphenyl)-propane, and
2,2-bis-(3-bromo-4-oxyphenyl)-propane.

Additional examples include bis-aromatic compounds in which the two aliphatic groups in the above-mentioned compounds are replaced by sulfide groups or sulfoxy groups, as shown below.

Tetrabromobenzene, hexachlorobenzene, hexabromobenzene, 2,2'-dichlorobiphenyl, 2,4'-dibromobiphenyl, 2,4'-di-chlorobiphenyl, hexabromobiphenyl, octabromobiphenyl, decabromobiphenyl, halogenated diphenyl ether containing 2-10 halogen atoms, and oligomers having a degree of polymerization of 1 to 20 which are formed from 2,2-bis-(3,5-dibromo-4-oxyphenyl)-propane and phosgene.

The halogenated compound which is favorably used in the present invention includes aromatic halogenated compounds (such as chlorinated benzene, brominated benzene, chlorinated biphenyl, chlorinated terphenyl, brominated biphenyl, and brominated terphenyl); compounds containing two phenyl nuclei separated by a divalent alkylene group, each of said phenyl nuclei having at least two chlorine or bromine atoms; and mixtures thereof. Preferable among them are hexabromobenzene, chlorinated biphenyl or terphenyl, and a mixture thereof with antimony oxide.

The typical phosphoric compound which is favorably used as a flame retardant in the present invention is one which is represented by the general formula below and a nitrogen analog thereof.

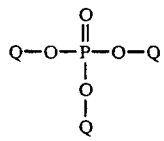

where Q denotes independently the same or different hydrocarbon group (such as alkyl, cycloalkyl, aryl, alkylsubstituted aryl, and aryl-substituted alkyl); halogen; hydrogen; or a combination thereof.

Adequate examples of the phosphoric ester include the following. Phenyl bisdodecyl phosphate, phenyl bisneopentyl phosphate, phenyl ethylene hydrogen phosphate, phenyl bis-(3,5,5'-trimethylhexyl) phosphate, ethyl diphenyl phosphate, 2-ethylhexyl di-(p-tolyl) phosphate, diphenyl hydrogen phosphate, bis-(2-ethylhexyl) p-tolyl phosphate, tritolyl phosphate, bis-(2-ethylhexyl) phenyl phosphate, tri(nonylphenyl) phosphate, phenyl methyl hydrogen phosphate, di(dodecyl) p-tolyl phosphate, triphenyl phosphate, halogenated triphenyl phosphate, dibutyl phenyl phosphate, 2-chloroethyl diphenyl phosphate, p-tolyl bis-(2,5,5'-trimethylhexyl) phosphate, 2-ethylhexyl diphenyl phosphate, and diphenyl hydrogen phosphate. Preferable among them is triphenyl phosphate. It is also desirable to use triphenyl phosphate in combination with hexabromobenzene or antimony oxide.

Other flame retardants that can be used in the present invention include compounds having the phosphorus-nitrogen bond, such as phosphorus nitride chloride, phosphoric ester amide, phosphoric acid amide, phosphine amide, tris(aziridinyl) phosphine oxide, and tetrakis(hydroxymethyl) phosphonium chloride.

There are no restrictions on the process for producing the resin composition of the present invention, and any known process can be used. An effective process consists of dissolving the components in a solvent and recovering the mixed components from the solution by evaporation or precipitation in a non-solvent. In the commercial production, however, the mixing of the components is usually performed in the molten state. The melt-mixing can be carried out using an ordinary single-screw extruder, twin-screw extruder, or kneader. A twin-screw extruder of high shear type is preferable.

It is desirable to mix the components uniformly in the powder or pellet form using a tumbler or Henschel mixer, prior to melt-mixing. However, this preliminary mixing may be omitted; instead, the individual components may be directly metered to the mixing machine.

The thus obtained mixture of the components is ready for injection molding, extrusion molding, etc. However, it is also possible to eliminate the mixing step. In this case, the individual components are dry-blended and the resulting dry blend is fed directly to an injection molding machine or extrusion molding machine which melts and mix the components, yielding the desired moldings.

The sequence of mixing is not specifically limited. Thus it is possible to mix all the components all at once. Alternatively, components (a) and (b) are mixed first and the mixture is mixed with component (c) and any or all of components (d), (e), and (f). Another sequence will be possible.

The thermoplastic resin composition of the present invention is superior in heat resistance, melt fluidity, processability, chemical resistance, impact resistance, appearance, and gloss. Owing to these characteristic properties, it can be made into molded articles, sheet, tubing, film, fiber, laminates, coating materials, and the like by injection molding and extrusion molding. The molded articles will find use as automotive parts such as bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of seat, glove box, console box, cooling fan, sirocco fan, brake oil tank, lamp housing, and roof. The molded articles will also find use as machine parts which need heat resistance. Other possible uses include motorcycle parts (such as covering material, muffler cover, and leg shield), electric and electronic parts (such as housing, chassis, connector, printed circuit board, and pulley), and other parts which all need strength and heat resistance.

EXAMPLES

The invention will be described in more detail with reference to the following examples, which are illustrative only and are not intended to limit the scope of the invention. In the examples, the heat distortion temperature (H.D.T.) is measured according to JIS K7202, the Izod impact strength (3.2 mm thick) is measured according to JIS K7110; the reduced viscosity ($\eta$ sp/c) of polyphenylene ether is measured on a chloroform solution (0.5 g/dl) at 25° C. and the melt-fluidity of the composition is evaluated in terms of melt index (MI) at 260° C. under a 10-kg load. The resin composition is made into an injection-molded sheet and its appearance observed with the naked eye is ranked according to the following criteria. good: without pearly segregation, poor: with pearly segregation.

EXAMPLES 1 to 7 AND COMPARATIVE EXAMPLES 1 TO 4

The resin compositions in these examples are composed of components (a), (b), (c), and (d) which are explained below.

Component (a): Polyphenylene ether
This is polyphenylene ether having a reduced viscosity ($\eta$ sp/c) of 0.45, made by Nippon Polyether Co., Ltd. (Designated as A-1 hereinafter.)

Component (b): Propylene polymer
This is "Sumitomo Noblen AV664B", a propylene-ethylene block copolymer, having an MI of 5.0 (230° C., 2.16 kg), made by Sumitomo Chemical Co., Ltd. (Designated as B hereinafter.)

Component (b): Modified propylene polymer
This includes the following three species.

(i) A styrene-grafted polymer prepared by reacting 4 kg of B in pellet form ("Sumitomo Noblen AV664B") with styrene monomer (1.2 kg) in a 50-liter autoclave containing water (20 liters), a dispersing agent ("Metholose 90SH-100", 30 g), and a peroxide ("Perbutyl PV"), at 120° C. for about 1 hour, while blowing nitrogen. followed by cooling and extraction with methyl ethyl ketone for the removal of polystyrene. (Yield: 4.9 kg) (Designated as BM-1 hereinafter.)

(ii) A styrene- and glycidyl methacrylate-grafted polymer prepared by reacting 5 kg of polypropylene in pellet form ("Sumitomo Noblen W101" [MI=8] made by Sumitomo Chemical Co., Ltd.) with styrene monomer (780 g) and glycidyl methacrylate (67 g) in an autoclave containing water (20 liters), a dispersing agent ("Metholose 90SH-100", 13 g), and a peroxide ("Perbutyl PV"), at 120° C. for about 1 hour, while blowing nitrogen, followed by cooling and extraction with methyl ethyl ketone for the removal of polystyrene. (Yield: 5.8 kg) (Designated as BM-2 hereinafter.)

(iii) A styrene- and glycidyl acrylate-grafted polymer prepared in the same manner as for BM-2, except that the graft monomers are replaced by 840 g of styrene and 57 g of glycidyl acrylate. (Yield: 5.7 kg) (Designated as BM-3 hereinafter.)

Component (c): Rubbery substance
This includes the following five species.

(i) Styrene-butadiene rubber having a Mooney viscosity $ML_{1+4}$ (100° C.) of 35 ("Sumitomo SBR 1507" made by Sumitomo Chemical Co., Ltd.). (Designated as SBR hereinafter.)

(ii) Ethylene-propylene-diene rubber having an MI of 3 (200° C., 5 kg) ("Sumitomo Esprene E-512F", made by Sumitomo Chemical Co., Ltd.). (Designated as EPDM hereinafter.)

(iii) Styrene-butadiene block copolymer ("Cariflex TR1116", made by Shell Chemical Co., Ltd.) (Designated as SB hereinafter.)

(iv) Ethylene-propylene rubber having a Mooney viscosity $ML_{1+4}$ (100° C.) of 44 ("Sumitomo Esprene E-201", made by Sumitomo Chemical Co., Ltd.). (Designated as EPR hereinafter.)

(v) Styrene-modified ethylene-propylene rubber prepared in the following manner. (Designated as CM-1 hereinafter.)

Preparation of styrene-modified ethylene-propylene rubber (CM-1): In a stainless steel autoclave equipped with a stirrer are placed 1 kg of "Esprene E-201" in small pieces (as ethylene-α-olefin copolymer rubber, EPM, $ML_{1+4}$ (100° C.)=27), 3 liters of pure water, 40 g of calcium tertiary phosphate, and 37 g of "Pluronic F-68" (made by Asahi Denka Kogyo Co., Ltd.). The atmosphere in the autoclave is completely replaced with nitrogen. To the autoclave are added 170 of styrene monomer and "Sunperox TO" (made by Sanken Kako Co., Ltd.) as a radical initiator. The contents in the autoclave are heated to 110° C. over 80 minutes, and reaction is performed for 1 hour. After cooling, the reaction product is filtered out to separate styrene-grafted copolymer rubber, which is subsequently thoroughly washed with pure water and dried in a vacuum.

Component (d): Styrene polymer
This component includes the following three species.

(i) Polystyrene having an MI of 32 (200° C., 5 kg), ("Sumitomo Esbrite 2V" made by Sumitomo Chemical Co., Ltd.). (Designated as D-1 hereinafter.)

(ii) Polystyrene having an MI of 3 (200° C., 5 kg), ("Sumitomo Esbrite 7M" made by Sumitomo Chemical Co., Ltd.). (Designated as D-2 hereinafter.)

(iii) Polystyrene having an MI of 10 (200° C., 5 kg), ("Sumitomo Esbrite UH-04" made by Sumitomo Chemical Co., Ltd.). (Designated as D-3 hereinafter.)

The above-mentioned components are mixed according to the formulation (in parts by weight) shown in Table 1. The resulting mixture undergoes melt-mixing with a twin-screw extruder (Model TEX44, made by Japan Steel Works, Ltd.) at a cylinder temperature of 260° C. and a screw speed of 300 rpm. The thus obtained resin composition is made into test pieces conforming to the ASTM standard using an injection molding machine (Model IS150E, made by Toshiba Machine Co., Ltd.) at a cylinder temperature of 260° C. and a mold temperature of 70° C.. The test pieces are tested for physical properties. The results are shown in Table 1.

It is noted from Table 1 that the resin composition has improved melt fluidity and provides moldings having improved gloss and appearance, without any adverse effect on mechanical properties, if it is incorporated with a styrene resin having an MI equal to or greater than 8.

TABLE 1

| | Resin composition (parts by weight) | | | | | Physical properties | | | |
| | | Component (b) | | | | | | | H.D.T. |
| Example No. (Comparative Example No.) | Component (a) Polyphenylene ether | Modified propylene polymer | Propylene polymer*1 | Component (c) Rubbery substance | Component (d) Styrene polymer | MI (260° C., 10 kg) | Appearance | Izod impact kg · cm/cm (at 23° C.) | (4.6 kg/ cm²) °C. |
|---|---|---|---|---|---|---|---|---|---|
| 1 | A-1 (34) | BM-1 (47) | B (0) | CM-1 (12) | D-1 (9)*2 | 19 | good | 13 | 128 |
| 2 | A-1 (34) | BM-1 (47) | B (0) | SBR (12)*3 | D-1 (9)*2 | 16 | good | 14 | 126 |
| 3 | A-1 (34) | BM-1 (47) | B (0) | SBR (12)*3 | D-1 (15)*2 | 22 | good | 13 | 130 |
| (1) | A-1 (34) | BM-1 (47) | B (0) | CM-1 (12) | — | 11 | poor | 14 | 117 |
| (2) | A-1 (34) | BM-1 (47) | B (0) | SBR (12)*3 | D-2 (15)*4 | 12 | poor | 8 | 136 |
| 4 | A-1 (39) | BM-2 (50) | B (12) | EPDM (15)*5 | D-3 (11)*8 | 23 | good | 13 | 128 |

TABLE 1-continued

| Example No. (Comparative Example No.) | Resin composition (parts by weight) | | | | | Physical properties | | | |
|---|---|---|---|---|---|---|---|---|---|
| | Component (a) Polyphenylene ether | Component (b) | | Component (c) Rubbery substance | Component (d) Styrene polymer | MI (260° C., 10 kg) | Appearance | Izod impact kg · cm/cm (at 23° C.) | H.D.T. (4.6 kg/cm²) °C. |
| | | Modified propylene polymer | Propylene polymer*¹ | | | | | | |
| 5 | A-1 (39) | BM-2 (50) | B (5) | EPDM (6)*⁵ SB (9)*⁶ | D-3 (13)*⁸ | 26 | good | 15 | 118 |
| 6 | A-1 (39) | BM-2 (50) | B (0) | SBR (3)*³ EPR (12)*⁷ | D-3 (13)*⁸ | 18 | good | 12 | 124 |
| (3) | A-1 (39) | BM-2 (50) | B (12) | EPDM (15)*⁵ | — | 14 | poor | 15 | 113 |
| 7 | A-1 (20) | BM-3 (42) | B (0) | EPDM (26)*⁵ | D-1 (12)*² | 18 | good | 20 | 115 |
| (4) | A-1 (20) | BM-3 (42) | B (0) | EPDM (26)*⁵ | D-1 (53)*² | 41 | good | 6 | 122 |

Note to Table 1
*¹Block polypropylene. MI = 5 (230° C., 2.16 kg): "Sumitomo Noblen AV664B", made by Sumitomo Chemical Co., Ltd.
*²Polystyrene. MI = 32 (200° C., 5 kg): "Sumitomo Esbrite 2V", made by Sumitomo Chemical Co., Ltd.
*³Styrene-butadiene rubber. $ML_{1-4}$ = 35 (100° C.): "Sumitomo SBR1507", made by Sumitomo Chemical Co., Ltd.
*⁴Polystyrene. MI = 3 (200° C., 5 kg): "Sumitomo Esbrite 7M", made by Sumitomo Chemical Co., Ltd.
*⁵Ethylene-propylene-diene rubber. $ML_{1-4}$ = 66 (121° C.): "Sumitomo Esprene E-512F", made by Sumitomo Chemical Co., Ltd.
*⁶Styrene-butadiene block copolymer: "Cariflex TR1116", made by Shell Chemical Co., Ltd.
*⁷Ethylene-propylene rubber. $ML_{1-4}$ = 44 (100° C.): "Sumitomo Esprene E201", made by Sumitomo Chemical Co., Ltd.
*⁸Polystyrene. MI = 10 (200° C., 5 kg): "Sumitomo Sumibrite UH-04", made by Sumitomo Chemical Co., Ltd.

EXAMPLES 8 TO 13 AND COMPARATIVE EXAMPLES 5 TO 7

The resin compositions in these examples are composed of components (a), (b), (c), and (e) which are explained below.

Component (a): Polyphenylene ether

This is polyphenylene ether having a reduced viscosity ($\eta$ sp/c) of 0.38, made by Nippon Polyether Co., Ltd. (Designated as A-2 hereinafter.)

Component (b): Modified propylene polymer

This includes the following three species.

(i) A mixture of styrene-grafted propylene polymer and styrene-grafted ethylene-butene copolymer prepared by reacting 4 kg of block polypropylene in pellet form ("Sumitomo Noblen W531" [MI=8.0] made by Sumitomo Chemical Co., Ltd.) and 1.1 kg of ethylene-butene copolymer in pellet form ("Sumitomo Excellent CN1007" [density=0.88 g/cm³] made by Sumitomo Chemical Co., Ltd.) with styrene monomer (1.8 kg) in a 50-liter autoclave containing water (4 liters), a dispersing agent ("Metholose 90SH-100", 70 g), and a peroxide ("Perbutyl PV"), at 120° C. for about 1 hour, while blowing nitrogen, followed by cooling and recovery. (Designated as B-1 hereinafter.)

(ii) A styrene- and glycidyl methacrylate-grafted polymer prepared by reacting 5 kg of block polypropylene in pellet form ("Sumitomo Noblen AY564" [MI=15] made by Sumitomo Chemical Co., Ltd.) with styrene monomer (680 g) and glycidyl methacrylate (54 g) in an autoclave containing water (20 liters), a dispersing agent ("Metholose 90SH-100", 16 g), and a peroxide ("Perbutyl PV"), at 120° C. for about 1 hour, while blowing nitrogen, followed by cooling and extraction with methyl ethyl ketone for the removal of polystyrene. (Designated as B-2 hereinafter.)

(iii) A styrene- and glycidyl acrylate-grafted polymer prepared in the same manner as for B-2, except that the graft monomers are replaced by 900 g of styrene and 61 g of glycidyl acrylate. (Designated as B-3 hereinafter.)

Component (c): Rubbery substance

This includes the following seven species.

(i) Styrene-modified ethylene-propylene rubber prepared in the following manner. (Designated as CM-2 hereinafter.)

Preparation of CM-2: In a stainless steel autoclave equipped with a stirrer are placed 1 kg of "Esprene E-301" in small pieces (as ethylene-α-olefin copolymer rubber, EPM, $ML_{1+4}$ (100° C.)=58), 3 liters of pure water, 40 g of calcium tertiary phosphate, and 37 g of "Pluronic F-68" (made by Asahi Denka Kogyo Co., Ltd.). The atmosphere in the autoclave is completely replaced with nitrogen. To the autoclave are added 120 of styrene monomer and "Sunperox" (made by Sanken Kako Co., Ltd.) as a radical initiator. The contents in the autoclave are heated to 110° C. over 80 minutes, and reaction is performed for 1 hour. After cooling, the reaction product is filtered out to separate styrene-grafted copolymer rubber, which is subsequently thoroughly washed with pure water and dried in a vacuum.

(ii) Ethylene-propylene-diene rubber ("Sumitomo Esprene E-305" [$ML_{1+4}$ (100° C.)=56] made by Sumitomo Chemical Co., Ltd.). (Designated as C-6 hereinafter.)

(iii) Styrene-butadiene random copolymer rubber ("Sumitomo SBR 1507" made by Sumitomo Chemical Co., Ltd.). (Designated as SBR hereinafter.)

(iv) Styrene-ethylene-butylene block copolymer ("Kraton G-1650" made by Shell Chemical Co., Ltd.). (Designated as SEBS hereinafter.)

(v) Ethylene-epoxy-acrylate copolymer ("Bondfast 2B" made by Sumitomo Chemical Co., Ltd.) (Designated as C-15 hereinafter.)

(vi) Styrene-ethylene-propylene block copolymer ("Kraton G-1701X" made by Shell Chemical Co., Ltd.). (Designated as SEP hereinafter.)

(vii) Styrene-butene copolymer ("Sumitomo Excellen Cn1003" [density=0.90 g/cm³] made by Sumitomo Chemical Co., Ltd.). (Designated as C-16 hereinafter.)

Component (e): Low-molecular weight hydrocarbon resin

This component includes the following five species which are commercially available.

(i) Terpene resin: "Clearon P-125" [ring and ball softening point=125° C.] made by Yasuhara Yushi Kogyo Co., Ltd. (Designated as E-1 hereinafter.)

(ii) Rosin resin: "Hariester L" made by Harima Kasei Co., Ltd. (Designated as E-2 hereinafter.)

(iii) Aromatic hydrocarbon resin: "Petrosin 150" made by Mitsui Petrochemical Industries, Ltd. (Designated as E-3 hereinafter.)

(iv) Alicyclic saturated hydrocarbon resin: "Arcon P-90" [ring and ball softening point=90° C.] made by Arakawa Kagaku Kogyo Co., Ltd. (Designated as E-4 hereinafter.)

(v) Coumarone-indene resin: "Cumer LX509" made by Neville Chemical Company. (Designated as E-5 hereinafter.)

The above-mentioned components are mixed according to the formulation (in parts by weight) shown in Table 2. The resulting mixture undergoes melt-mixing with a twin-screw extruder (Model TEX44, made by Japan Steel Works, Ltd.) at a cylinder temperature of 260° C. and a screw speed of 250 rpm. The thus obtained resin composition is made into test pieces conforming to the ASTM standard using an injection molding machine (Model IS150E, made by Toshiba Machine Co., Ltd.) at a cylinder temperature of 260° C. and a mold temperature of 60° C. The test pieces are tested for physical properties. The results are shown in Table 2.

It is noted from Table 2 that the resin composition (in Examples 8 to 13) has improved melt fluidity and provides moldings having improved gloss and appearance, without any adverse effect on heat resistance, if it is incorporated with a low-molecular weight hydrocarbon resin. The resin composition (in Comparative Examples 5 and 6) without low-molecular weight hydrocarbon resin yields moldings with pearly segregation. The resin composition (in Comparative Example 7) incorporated with triphenyl phosphate (plasticizer) yields moldings with a good appearance only at the great expanse of heat resistance.

and 0.61, made by Nippon Polyether Co., Ltd. (Designated as A-3, A-4, and A-5, respectively, hereinafter.)

Component (b): Modified propylene polymer

This includes the following four species.

(i) A mixture of styrene-grafted propylene polymer and styrene-grafted ethylene-butene copolymer prepared by reacting 4 kg of block polypropylene in pellet form ("Sumitomo Noblen FA6411D" [MI=7.7] made by Sumitomo Chemical Co., Ltd.) with styrene monomer (2.1 kg) in a 50-liter autoclave containing water (4 liters), a dispersing agent ("Metholose 90SH-100", 80 g), and a peroxide ("Perbutyl PV"), at 115° C. for about 1 hour, while blowing nitrogen, followed by cooling and recovery. (Designated as B-4 hereinafter.)

(ii) A styrene-grafted propylene polymer composition prepared by reacting 1 kg of polypropylene in pellet form ("Sumitomo Noblen FS6632" [MI=6.0] made by Sumitomo Chemical Co., Ltd.) and 4 kg of polypropylene in pellet form ("Sumitomo Noblen H503A" [MI=4.0] made by Sumitomo Chemical Co., Ltd.) with styrene monomer (2950 g) in an autoclave containing water (20 liters), a dispersing agent ("Metholose 90SH-100", 29 g), and a peroxide ("Perbutyl PV"), at 120° C. for about 1 hour, while blowing nitrogen, followed by cooling and extraction with methyl ethyl ketone for the removal of polystyrene. (Designated as B-5 hereinafter.)

TABLE 2

| Example No. (Comparative Example No.) | Resin composition (parts by weight) | | | | Physical properties | | | |
|---|---|---|---|---|---|---|---|---|
| | Component (a) Polyphenylene ether | Component (b) Modified propylene polymer | Component (c) Rubbery substance | Component (e) low M.W. hydrocarbon resin | MI (260° C.) g/10 min | Appearance*[1] | Izod impact with notch (at 23° C.) kg · cm/cm | H.D.T. (4.6 kg/cm$^2$) °C. |
| 8 | A-2 (33) | B-1 (47) | C-6 (15) | E-1 (5)*[3] | 28 | good | 24 | 117 |
| 9 | A-2 (33) | B-1 (47) | C-6 (15) | E-4 (5)*[4] | 31 | good | 20 | 119 |
| 10 | A-2 (33) | B-1 (47) | SBR (9), CM-2 (6) | E-3 (5)*[6] | 42 | good | 25 | 120 |
| 11 | A-2 (33) | B-1 (47) | SEBS (10), C-15 (5) | E-3 (5)*[6] | 37 | good | 31 | 118 |
| (5) | A-2 (33) | B-1 (47) | C-6 (15) | — | 13 | poor | 15 | 124 |
| 12 | A-2 (39) | B-2 (45) | SEP (7), C-6 (9) | E-2 (8)*[10] | 27 | good | 17 | 131 |
| 13 | A-2 (39) | B-3 (45) | CM-2 (10), C-16 (6) | E-1 (4)*[3] E-5 (4)*[12] | 33 | good | 19 | 130 |
| (6) | A-2 (39) | B-3 (45) | CM-2 (10), C-16 (6) | — | 11 | poor | 11 | 135 |
| (7) | A-2 (39) | B-3 (45) | CM-2 (10), C-16 (6) | TPP (8)*[13] | 31 | good | 9 | 98 |

Note to Table 2
*[1] Evaluated for injection-molded sheet. good: without pearly segregation, poor: with pearly segregation.
*[3] Terpene resin: "Clearon P-125" [softening point = 125° C.] made by Yasuhara Yushi Kogyo Co., Ltd.
*[4] Alicyclic saturated hydrocarbon resin: "Arcon P-90" [softening point = 90° C.] made by Arakawa Kagaku Kogyo Co., Ltd.
*[6] Aromatic hydrocarbon resin: "Petrosin 150" made by Mitsui Petrochemical Industries, Ltd.
*[10] Rosin resin: "Hariester L" made by Harima Kasei Co., Ltd.
*[12] Coumarone-indene resin: "Cumer LX509" made by Neville Chemical Company.
*[13] Triphenyl phosphate

EXAMPLES 14 TO 28 AND COMPARATIVE EXAMPLES 8 TO 12

The resin compositions in these examples are composed of components (a), (b), (c), and (f) which are explained below.

These components are mixed using a twin-screw extruder (Model TEX44, made by Japan Steel Works, Ltd.) at a cylinder temperature of 240°–260° C. and a screw speed of 300 rpm. The thus obtained resin composition is made into test pieces conforming to the ASTM standard using an injection molding machine (Model IS150E, made by Toshiba Machine Co., Ltd.) at a cylinder temperature of 240°–260° C. and a mold temperature of 70° C. The test pieces are tested for physical properties.

Component (a): Polyphenylene ether

This includes three grades of polyphenylene ether each having a reduced viscosity ($\eta$ sp/c) of 0.39, 0.30, (iii) A styrene- and glycidyl acrylate-grafted polymer prepared in the same manner as for B-4, except that the graft monomers are replaced by 1100 g of styrene and 72 g of glycidyl acrylate. (Designated as B-6 hereinafter.)

(iv) A maleic anhydride- and styrene-grafted polypropylene prepared in the following manner. First, 100 parts by weight of polypropylene ("Sumitomo Noblen AW564" [MI=9.0] made by Sumitomo Chemical Co., Ltd.) is mixed with 2.0 parts by weight of maleic anhydride, 3.1 parts by weight of styrene monomer, 1.2 parts by weight of propylene homopolymer supporting 6 wt% of 1,3-bis(t-butylperoxyisopropyl)benzene (a radical initiator "Sunperox TY1.3" made by Sanken Kako Co., Ltd.), and 0.1 part by weight of stabilizer ("Irganox 1010" made by Ciba-Geigy Corp.) using a Henschel mixer. The mixture undergoes melt-mixing by a twin-screw extruder (Model TEX44SS-30BW-2V, made by Japan Steel Works, Ltd.) at 225° C. for an average residence time of 1.5 minutes. This grafted polypropylene contains 0.9 wt% of maleic anhydride added and has a melt flow rate of 17 (g/10 min). (Designated as B-7 hereinafter.)

Component (c): Rubbery substance

This includes the following 14 species.

(i) Styrene-grafted ethylene-propylene-diene rubber prepared in the following manner. (Designated as C-1 hereinafter.)

In a stainless steel autoclave equipped with a stirrer are placed 100 parts by weight of "Esprene E-316" in small pieces (as ethylene-α-olefin copolymer rubber, EPDM, $ML_{1+4}$ (121° C.)=65, made by Sumitomo Chemical Co., Ltd.), 330 parts by weight of pure water, 4 parts by weight of calcium tertiary phosphate, and 5.0 parts by weight of "Pluronic F-68" (made by Asahi Denka Kogyo Co., Ltd.). The atmosphere in the autoclave is completely replaced with nitrogen while stirring. To the autoclave are added 14 parts by weight of styrene monomer and 0.75 part by weight of "Sunperox TO" (made by Sanken Kako Co., Ltd.) as a radical initiator. The contents in the autoclave are heated to 115° C. over 80 minutes, and reaction is performed for 1 hour. After cooling, the reaction product is filtered out to separate styrene-grafted copolymer rubber, which is subsequently thoroughly washed with pure water and dried in a vacuum.

(ii) Styrene-grafted ethylene-propylene rubber prepared in the following manner. (Designated as C-2 hereinafter.)

In a stainless steel autoclave equipped with a stirrer are placed 100 parts by weight of "Esprene E-201" in small pieces (as ethylene-α-olefin copolymer rubber, EPR, $ML_{1+4}$(100° C.)=43, made by Sumitomo Chemical Co., Ltd.), 450 parts by weight of pure water, 4.0 parts by weight of calcium tertiary phosphate, and 4.0 parts by weight of "Pluronic F-68" (made by Asahi Denka Kogyo Co., Ltd.). The atmosphere in the autoclave is completely replaced with nitrogen while stirring. To the autoclave are added 27 parts by weight of styrene monomer and 0.75 part by weight of "Sunperox TO" (made by Sanken Kako Co., Ltd.) as a radical initiator. The contents in the autoclave are heated to 110° C. over 1 hour, and reaction is performed for 1 hour. After cooling, the reaction product is filtered out to separate styrene-grafted copolymer rubber, which is subsequently thoroughly washed with pure water and dried in a vacuum.

(iii) Glycidyl methacrylate-grafted ethylene-propylene-diene rubber prepared in the following manner. (Designated as C-3 hereinafter.)

In a stainless steel autoclave equipped with a stirrer are placed 100 parts by weight of "Esprene E-316" in small pieces (as ethylene-propylene-diene rubber copolymer rubber, EPDM, $ML_{1+4}$ (121° C.)=27, made by Sumitomo Chemical Co., Ltd.), 350 parts by weight of pure water, 4.0 parts by weight of calcium tertiary phosphate, and 4.0 parts by wight of "Pluronic F-68" (made by Asahi Denka Kogyo Co., Ltd.). The atmosphere in the autoclave is completely replaced with nitrogen while stirring. To the autoclave are added 27 parts by weight of glycidyl methacrylate and 0.9 part by weight of "Sunperox TO" (made by Sanken Kako Co., Ltd.) as a radical initiator. The contents in the autoclave are heated to 110° C. over 80 minutes, and reaction is performed for 1 hour. After cooling, the reaction product is filtered out to separate glycidyl methacrylate-grafted copolymer rubber, which is subsequently thoroughly washed with pure water and dried in a vacuum.

(iv) Maleic anhydride- and styrene-grafted ethylene-propylene-diene rubber prepared in the following manner. (Designated as C-4 hereinafter.)

First, 100 parts by weight of "Esprene E-505" in pellet form (as ethylene-propylene copolymer rubber, $ML_{1+4}$ (100° C.)=27, made by Sumitomo Chemical Co., Ltd.) is mixed with 2.0 parts by weight of maleic anhydride, 4.0 parts by weight of styrene, and 1.0 part by weight of propylene homopolymer supporting 8 wt% of 1,3-bis(t-butylperoxyisopropyl)benzene (a radical initiator "Sunperox TY-1.3" made by Sanken Kako Co., Ltd.) using a Henschel mixer. The mixture undergoes melt-mixing at 250° C. by a twin-screw extruder (Model TEX44SS-30BW-2V, made by Japan Steel Works, Ltd.) with a throughput of 18 kg/hour. This grafted copolymer rubber contains 1.3 wt% of maleic anhydride added and 1.6 wt% of styrene added and has a Mooney viscosity $ML_{1+4}$ (100° C.) of 89.

(v) Epoxy group-containing copolymer. (Designated as C-5 hereinafter.) This is a terpolymer composed of ethylene (80 wt%), vinyl acetate (7 wt%), and glycidyl methacrylate (13 wt%), having a melt flow ratio of 10 g/10 min (190° C., 2.16 kg), formed by high-pressure radical polymerization according to the process disclosed in Japanese Patent Laid-open Nos. 23490/1972 and 11888/1973.

(vi) Ethylene-propylene-diene rubber ("Esprene E305" [$ML_{1+4}$ (100° C.) =56] made by Sumitomo Chemical Co., Ltd.) (Designated as C-6 hereinafter.) (vii) Styrene-butadiene-styrene block copolymer ("Cariflex TR1101" made by Shell Chemical Co., Ltd.) (Designated as C-7 hereinafter.) (viii) Styrene-ethylene-block copolymer ("Kraton G1701X" made by Shell Chemical Co., Ltd.) (Designated as SEP hereinafter.) (ix) Styrene-butadiene random copolymer rubber ("Sumitomo SBR1500" [$ML_{1+4}$ (100° C.) =52] made by Sumitomo Chemical Co., Ltd.) (Designated as C-9 hereinafter.) (x) Acrylic rubber ("Nipol AR51" made by Nippon Zeon Co., Ltd. (Designated as C-10 hereinafter.)

(xi) Polyisoprene rubber ("IR2200" [$ML_{1+4}$ (100° C.)=82] made by Japan Synthetic Rubber Co., Ltd.) (Designated as C-11 hereinafter.) (xii) Styrene-isoprene-styrene copolymer ("Cariflex TR1111" made by Shell Chemical Co., Ltd.) (Designated as C-12 hereinafter.) (xiii) Ethylene-butene copolymer ("Sumitomo Excellen CN1007" [density=0.88g/cm$^3$] made by Sumitomo Chemical Co., Ltd.) (Designated as C-13 hereinafter.) (xiv) Styrene-ethylene-butene block copolymer ("Kraton G1650" made by Shell Chemical Co., Ltd.) (Designated as SEBS hereinafter.)

Component (f): White oil and liquid paraffin

This includes the following seven species.

(i) "Kaydol" [viscosity (SUS 37.8° C.)=345], made by Witco Co., Ltd. (Designated as F-1 hereinafter.)

(ii) "Venol" [viscosity (SUS 37.8° C.)=98], made by Witco Co., Ltd. (Designated as F-2 hereinafter.)

(iii) "Protol" [viscosity (SUS 37.8° C.)=183], made by Witco Co., Ltd. (Designated as F-3 hereinafter.)

(iv) "Molesco White P-120" [viscosity (SUS 37.8° C.)=122], made by Matsumura Sekiyu Co., Ltd. (Designated as F-4 hereinafter.)

(v) "Molesco White P-250" [viscosity (SUS 37.8° C.)=250], made by Matsumura Sekiyu Co., Ltd. (Designated as F-5 hereinafter.)

(vi) "Daphene CP15N" [viscosity (SUS 37.8° C.)=80], made by Idemitsu Kosan Co., Ltd. (Designated as F-6 hereinafter.)

(vii) "High White 120" [viscosity (SUS 37.8° C.)=120], made by Nippon Oil Co., Ltd. (Designated as F-7 hereinafter.)

EXAMPLES 14 TO 23 AND COMPARATIVE EXAMPLES 8 TO 10

Resin compositions are prepared from component (a), which is A-3 (polyphenylene ether [$\eta sp/c = 0.39$] made by Nippon Polyether Co., Ltd.), component (b), which is B-1 (modified propylene polymer), component (c), and component (f) according to the formulation shown in Table 3. The resin compositions are made into test pieces by injection molding, and the test pieces are tested for physical properties. The results are shown in Table 3.

It is noted from Table 3 that the resin composition composed of polyphenylene ether, modified propylene polymer, rubbery substance, and white oil or liquid paraffin provides moldings having a better appearance and higher mechanical strength than the resin composition composed of polyphenylene ether, modified propylene polymer, and rubbery substance.

EXAMPLES 24 AND 25 AND COMPARATIVE EXAMPLE 11

Resin compositions are prepared from component (a), which is A-4 (polyphenylene ether [$\eta sp/c = 0.30$] made by Nippon Polyether Co., Ltd.), and polystyrene ("Sumitomo Noblen AV664B [MI = 50] made by Sumitomo Chemical Co., Ltd.), component (b), which is B-2 (modified propylene polymer), component (c), and component (f) according to the formulation shown in Table 4. The resin compositions are made into test pieces by injection molding, and the test pieces are tested for physical properties. The results are shown in Table 4.

It is noted from Table 4 that the resin composition composed of a polyphenylene ether-containing composition, modified propylene polymer, rubbery substance, and white oil or liquid paraffin provides moldings having a better appearance and higher mechanical strength than the resin composition composed of a polyphenylene ether-containing composition, modified propylene polymer, and rubbery substance.

EXAMPLES 26 TO 28 AND COMPARATIVE EXAMPLE 12

Resin compositions are prepared from component (a), which is A-5 (polyphenylene ether [$\eta sp/c = 0.61$] made by Nippon Polyether Co., Ltd.), component (b), which is B-3 or B-4 (modified propylene polymer), component (c), and component (f) according to the formulation shown in Table 5. The resin compositions are made into test pieces by injection molding, and the test pieces are tested for physical properties. The results are shown in Table 5.

It is noted from Table 5 that the resin composition composed of polyphenylene ether, modified propylene polymer, block polypropylene, rubbery substance, and white oil or liquid paraffin provides moldings having a better appearance and higher mechanical strength than the resin composition composed of polyphenylene ether, modified propylene polymer, block polypropylene, and rubbery substance.

TABLE 3

| | Resin composition (parts by weight) | | | | Physical properties | | | | |
|---|---|---|---|---|---|---|---|---|---|
| Example No. (Comparative Example No.) | Component (a) Polyphenylene ether | Component (b) Modified propylene polymer | Component (c) Rubbery substance | Component (f) White oil, liquid paraffin | MI g/10 min | Appearance | Izod impact with notch at −30° C. kg · cm/cm | Izod impact with notch at 23° C. kg · cm/cm | H.D.T. (4.6 kg) °C. |
| 14 | A-3 (37) | B-4 (53) | C-6 (12) | F-1 (8) | 33 | good | 14 | 28 | 139 |
| 15 | A-3 (8) | B-4 (82) | C-6 (12) | F-1 (8) | 51 | good | 15 | 31 | 108 |
| 16 | A-3 (37) | B-4 (53) | C-1 (12) | F-1 (8) | 37 | good | 13 | 25 | 140 |
| 17 | A-3 (37) | B-4 (53) | C-7 (12) | F-1 (8) | 41 | good | 18 | 37 | 132 |
| 18 | A-3 (37) | B-4 (53) | SEP (12) | F-1 (8) | 43 | good | 16 | 35 | 126 |
| 19 | A-3 (37) | B-4 (53) | C-9 (12) | F-1 (8) | 35 | good | 14 | 27 | 135 |
| 20 | A-3 (37) | B-4 (53) | C-2 (7), C-11 (5) | F-1 (8) | 32 | good | 13 | 21 | 129 |
| 21 | A-3 (37) | B-4 (53) | C-5 (4), C-9 (8) | F-1 (8) | 39 | good | 20 | 39 | 138 |
| 22 | A-3 (37) | B-4 (53) | C-7 (8), C-5 (4) | F-1 (8) | 31 | good | 18 | 29 | 135 |
| 23 | A-3 (37) | B-4 (53) | C-10 (3), SEP (9) | F-2 (8) | 29 | good | 17 | 25 | 133 |
| (8) | A-3 (37) | B-4 (53) | C-1 (12) | — | 15 | poor | 11 | 26 | 134 |
| (9) | A-3 (37) | B-4 (53) | C-1 (12) | 8*[1] | 27 | poor | 9 | 18 | 145 |
| (10) | A-3 (37) | B-4 (53) | C-1 (12) | 8*[2] | 19 | poor | 7 | 23 | 127 |

*[1]Cyclopentadiene-based hydrogenated petroleum resin: "Escolets 5000" made by Toneks Co., Ltd.
*[2]Silicone oil: "Shinetsu Silicone Oil KF96" made by Shinetsu Chemical Co., Ltd.

TABLE 4

| | Resin composition (parts by weight) | | | | | Physical properties | | | |
|---|---|---|---|---|---|---|---|---|---|
| Example No. (Comparative Example No.) | Component (a) Polyphenylene ether | Component (a) Polystyrene*[1] | Component (b) Modified propylene polymer | Component (c) Rubbery substance | Component (f) White oil, liquid paraffin | MI g/10 min | Appearance | Izod impact with notch at −30° C. kg · cm/cm | Izod impact with notch at 23° C. kg · cm/cm | H.D.T. (4.6 kg) °C. |
| 24 | A-4 (38) | 15 | B-5 (47) | C-12 (28) | F-6 (3) | 31 | good | 17 | 28 | 122 |
| 25 | A-4 (38) | 15 | B-5 (47) | C-13 (10) C-6 (18) | F-7 (3) | 28 | good | 15 | 26 | 119 |
| (11) | A-4 (38) | 15 | B-5 (47) | C-12 (28) | — | 20 | poor | 12 | 24 | 127 |

*[1]"Esbrite 6" made by Sumitomo Chemical Co., Ltd.

TABLE 5

| Example No. (Comparative Example No.) | Resin composition (parts by weight) | | | | | Physical properties | | | | |
|---|---|---|---|---|---|---|---|---|---|---|
| | Component (a) Polyphenylene ether | Component (b) Modified propylene polymer | Component (b) Block polypropylene*1 | Component (c) Rubbery substance | Component (f) White oil, liquid paraffin | MI g/10 min | Appearance | Izod impact with notch at −30° C. kg·cm/cm | Izod impact with notch at 23° C. kg·cm/cm | H.D.T. (4.6 kg) °C. |
| 26 | A-5 (22) | B-6 (30) | 23 | C-3 (16) | F-4 (9) | 42 | good | 13 | 21 | 112 |
| 27 | A-5 (22) | B-7 (30) | 23 | C-4 (16) | F-5 (9) | 35 | good | 11 | 23 | 114 |
| 28 | A-5 (22) | B-7 (30) | 23 | C-4 (5) SEBS (11) | F-3 (9) | 34 | good | 14 | 25 | 116 |
| (12) | A-5 (22) | B-6 (30) | 23 | C-3 (16) | — | 23 | poor | 8 | 17 | 119 |

*1"Sumitomo Noblen AV664B" [MI = 5.0] made by Sumitomo Chemical Co., Ltd.

EFFECT OF THE INVENTION

As mentioned above, the present invention provides a thermoplastic resin composition which exhibits not only good moldability but also well-balanced physical properties. The resin composition can be easily processed into molded articles by injection molding and extrusion molding which are normally used for polyphenylene ether-based thermoplastic resin compositions. The resulting molded articles have outstanding impact resistance, heat resistance, hardness, appearance, smoothness, and good appearance.

What is claimed is:

1. A thermoplastic resin composition which comprises:
   (a) polyphenylene ether or a composition containing polyphenylene ether,
   (b) (i) a modified propylene polymer grafted with a styrene-based monomer or a mixture of a styrene-based monomer and a monomer copolymerizable with said styrene-based monomer, or (ii) a composition containing said modified propylene polymer and a propylene polymer,
   (c) a rubbery substance, wherein said substance is a natural or synthetic polymeric material which is elastic at room temperature, and at least one component selected from the group consisting of
   (d) a styrene-based resin having a melt index of 8 or above (at 250° C. under a load of 5 kg),
   (e) a low-molecular weight hydrocarbon resin,
   (f) white oil, and
   (g) liquid paraffin.

2. A thermoplastic resin composition which comprises:
   (a) polyphenylene ether or a composition containing polyphenylene ether,
   (b) (i) a modified propylene polymer grafted with a styrene-based monomer or a mixture of a styrene-based monomer and a monomer copolymerizable with said styrene-based monomer, or (ii) a composition containing said modified propylene polymer and a propylene polymer,
   (c) a rubbery substance, wherein said substance is a natural or synthetic polymeric material which is elastic at room temperature, and at least one component selected from the group consisting of
   (d) A styrene-based resin having a melt index of 8 or above (at 250° C. under a load of 5 kg),
   (e) a low-molecular weight hydrocarbon resin,
   (f) white oil, and
   (g) liquid paraffin, the ratio of component (a) to component (b) being 1–90 wt% to 99–10 wt%, the amount of component (c) being 1–50 parts by weight per 100 parts by weight of the total amount of components (a) and (b), and the total amount of components (d), (e), and (f) being 0.1–50 parts by weight per 100 parts by weight of the total amount of components (a), (b), and (c).

3. A thermoplastic resin composition which comprises:
   (a) polyphenylene ether or a composition containing polyphenylene ether,
   (b) (i) a modified propylene polymer grafted with a styrene-based monomer or a mixture of a styrene-based monomer and a monomer copolymerizable with said styrene-based monomer, or (ii) a composition containing said modified propylene polymer and a propylene polymer,
   (c) a rubbery substance, wherein said substance is a natural or synthetic polymeric material which is elastic at room temperature, and at least one component selected from the group consisting of
   (e) a low-molecular weight hydrocarbon resin,
   (f) white oil, and
   (g) liquid paraffin.

4. A thermoplastic resin composition which comprises:
   (a) polyphenylene ether or a composition containing polyphenylene ether,
   (b) (i) a modified propylene polymer grafted with a styrene-based monomer or a mixture of a styrene-based monomer and a monomer copolymerizable with said styrene-based monomer, or (ii) a composition containing said modified propylene polymer and a propylene polymer,
   (c) a rubbery substance, wherein said substance is a natural or synthetic polymeric material which is elastic at room temperature, and at least one component selected from the group consisting of
   (e) a low-molecular weight hydrocarbon resin,
   (f) white oil, and
   (g) liquid paraffin, the ratio of component (a) to component (b) being 1–90 wt% to 99–10 wt%, the amount of component (c) being 1–50 parts by weight per 100 parts by weight of the total amount of components (a) and (b), and the total amount of components (e) and (f) being 0.1–50 parts by weight per 100 parts by weight of the total amount of components (a), (b), and (c).

5. A thermoplastic resin composition which comprises:
   (a) polyphenylene ether or a composition containing polyphenylene ether,
   (b) (i) a modified propylene polymer grafted with a styrene-based monomer or a mixture of a styrene-based monomer and a monomer copolymerizable with said styrene-based monomer, or (ii) a composition containing said modified propylene polymer and a propylene polymer, (c) a rubbery substance, wherein said substance is a natural or synthetic polymeric material which is elastic at room temperature, and (d) a styrene-based resin having a melt index of 8 or above (at 250° C. under a load of 5 kg), the ratio of component (a) to component (b) being 1-90 wt% to 99-10 wt%, the amount of component (c) being 1-50 parts by weight per 100 parts by weight of the total amount of components (a) and (b), and the amount of component (d) being 1-30 part by weight per 100 parts by weight of the total amount of components (a), (b), and (c).

6. A thermoplastic resin composition which comprises:

(a) polyphenylene ether or a composition containing polyphenylene ether, (b) (i) a modified propylene polymer grafted with a styrene-based monomer or a mixture of a styrene-based monomer and a monomer copolymerizable with said styrene-based monomer, or (ii) a composition containing said modified propylene polymer and a propylene polymer, (c) a rubbery substance, wherein said substance is a natural or synthetic polymeric material which is elastic at room temperature, and (e) a low-molecular weight hydrocarbon resin, the ratio of component (a) to component (b) being 1-90 wt% to 99-10 wt%, the amount of component (c) being 1-50 parts by weight per 100 parts by weight of the total amount of components (a) and (b), and the amount of component (e) being 0.1-50 parts by weight per 100 parts by weight of the total amount of components (a), (b), and (c).

7. A thermoplastic resin composition as claimed in claim 1, 2, 3, 4, or 6, wherein said low-molecular weight hydrocarbon resin component (e) is at least one member selected from the group consisting of rosin resin, terpene resin, coumarone-indene resin, alicyclic saturated hydrocarbon resin, aromatic hydrocarbon resin, and hydrogenated or modified products thereof.

8. A thermoplastic resin composition as claimed in claim 7, wherein said low-molecular weight hydrocarbon resin component (e) is one which has a molecular weight of 200 to 5000.

9. A thermoplastic resin composition which comprises:

(a) polyphenylene ether or a composition containing polyphenylene ether, (b) (i) a modified propylene polymer grafted with a styrene-based monomer or a mixture of a styrene-based monomer and a monomer copolymerizable with said styrene-based monomer, or (ii) a composition containing said modified propylene polymer and a propylene polymer, (c) a rubbery substance, wherein said substance is a natural or synthetic polymeric material which is elastic at room temperature, and at least one component selected from the group consisting of (f) white oil, and (g) liquid paraffin, the ratio of component (a) to component (b) being 1-90 wt% to 99-10 wt%, the amount of component (c) being 1-70 parts by weight per 100 parts by weight of the total amount of components (a) and (b), and the amount of component (f) being 0.1-30 parts by weight per 100 parts by weight of the total amount of components (a), (b), and (c).

10. A thermoplastic resin composition as claimed in claim 1, 2, 3, 4, or 9, wherein component (f) and component (g) are white oil and liquid paraffin, respectively, having a viscosity of 40 to 400 (SUS second) at 37.8° C. conforming to JIS K-2283.

11. A thermoplastic resin composition as claimed in anyone of claims 1-6 o r 9, wherein said propylene polymer is a highly crystalline propylene homopolymer or block copolymer wherein the fraction of propylene homopolymer contains boiling heptane insolubles whose isotactic pentad ratio is higher than 0.970.

12. A thermoplastic resin composition as claimed in any one of claims 1-6 or 9, wherein said propylene polymer is a highly crystalline propylene homopolymer or block copolymer wherein the fraction of propylene homopolymer contains boiling heptane insolubles whose isotactic pentad ratio is higher than 0.970 and also contains less than 5.0 wt% of boiling heptane solubles and less than 2.0 wt% of xylene (20° C.) solubles.

13. A thermoplastic resin composition as claimed in any one of claims 1-6 or 9, wherein said propylene polymer composition is one which is obtained by blending a propylene polymer with a vinylcycloalkane polymer having 6 or more carbon atoms and contains 0.05 to 10000 ppm (by weight) of vinylcycloalkane units.

14. A thermoplastic resin composition as claimed in any one of claims 1-6 or 9, wherein said rubbery substance component (c) is one which contains at least one component selected from the group consisting of ethylene-α-olefin copolymers and modified products thereof, ethylene-propylene-unsaturated diene rubbers and modified products thereof, butadiene-styrene copolymers and hydrogenated products thereof, and epoxy group-containing copolymers.

15. A thermoplastic resin composition as claimed in claim 14, wherein said ethylene-α-olefin copolymer rubber is one which contains 15 to 85 wt% of ethylene and has a Mooney viscosity $ML_{1+4}$(121° C.) of 5 to 120 and a glass transition point lower than $-10°$ C.

16. A thermoplastic resin composition as claimed in any one of claim 1-6 or 9, wherein said polyphenylene ether component (a) is one which is obtained by the oxidative coupling polymerization of one or more than one phenol compound represented by the general formula below,

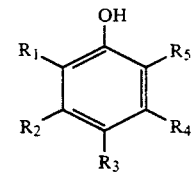

where $R_1$, $R_2$, $R_3$, $R_4$, and $R_5$ each independently denotes a hydrogen atom, a halogen atom, a hydrocarbon group or substituted hydrocarbon group, or a hydrocarbyloxy group or substituted hydrocarbyloxy group; and at least one of $R_1$ to $R_5$ is invariably a hydrogen atom.

17. Automotive parts which are made of the thermoplastic resin composition claimed in claim 1.

18. Automotive parts as claimed in claim 17 which include those selected from the group consisting of a bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of seat, glove box, console box, cooling fan, sirocco fan, brake oil tank, lamp housing, and roof.

* * * * *